United States Patent
Inoue et al.

(10) Patent No.: US 10,982,616 B2
(45) Date of Patent: Apr. 20, 2021

(54) PREMIXED COMPRESSION IGNITION TYPE ENGINE WITH SUPERCHARGING SYSTEM

(71) Applicant: Mazda Motor Corporation, Hiroshima (JP)

(72) Inventors: Atsushi Inoue, Aki-gun (JP); Masanari Sueoka, Hiroshima (JP); Yusuke Kawai, Hiroshima (JP); Tetsuya Chikada, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/640,143

(22) PCT Filed: Aug. 23, 2018

(86) PCT No.: PCT/JP2018/031185
§ 371 (c)(1),
(2) Date: Feb. 19, 2020

(87) PCT Pub. No.: WO2019/039554
PCT Pub. Date: Feb. 28, 2019

(65) Prior Publication Data
US 2020/0191087 A1    Jun. 18, 2020

(30) Foreign Application Priority Data

Aug. 25, 2017  (JP) .............................. JP2017-162860
Aug. 25, 2017  (JP) .............................. JP2017-162861

(51) Int. Cl.
*F02D 41/30*     (2006.01)
*F02B 11/02*     (2006.01)
(Continued)

(52) U.S. Cl.
CPC .......... *F02D 41/3041* (2013.01); *F02B 11/02* (2013.01); *F02B 23/02* (2013.01);
(Continued)

(58) Field of Classification Search
CPC .................................................. F02D 41/3041
See application file for complete search history.

(56) References Cited

U.S. PATENT DOCUMENTS

| 5,549,095 A | 8/1996 | Goto et al. |
| 6,293,246 B1 * | 9/2001 | Tanahashi ............. F02D 35/023 123/305 |

(Continued)

FOREIGN PATENT DOCUMENTS

| EP | 1840357 A2 | 10/2007 |
| JP | H07145740 A | 6/1995 |

(Continued)

OTHER PUBLICATIONS

Gerow, M. et al., "A Comparison of Valving Strategies Appropriate for Multi-Mode Combustion Within a Downsized Boosted Automotive Engine Part B: Mid Load Operation Within the SACI Combustion Regime," Proceedings of the ASME 2013 Internal Combustion Engine Division Fall Technical Conference, Oct. 13, 2013, Dearborn, Michigan, 14 pages.

(Continued)

*Primary Examiner* — Kevin R Steckbauer
(74) *Attorney, Agent, or Firm* — Alleman Hall Creasman & Tuttle LLP

(57) ABSTRACT

When the geometric compression ratio of an engine body is set to 13:1 or more and the engine body operates in a preset high load region, the effective compression ratio of the engine body is set to 12:1 or more with a difference from the geometric compression ratio being within 2, a gas to be introduced into a combustion chamber is supercharged by a (Continued)

supercharging system, fuel is injected at least in a compression stroke by an injector, and after the fuel injection is finished, an air-fuel mixture in the combustion chamber is ignited by an ignition device before the compression top dead center and is thus burned by flame propagation in the engine body, and then the unburned air-fuel mixture is burned by compression ignition.

19 Claims, 13 Drawing Sheets

(51) Int. Cl.
- F02B 23/02 (2006.01)
- F02B 23/10 (2006.01)
- F02D 13/02 (2006.01)
- F02D 41/00 (2006.01)
- F02D 41/40 (2006.01)
- F02P 5/04 (2006.01)
- F02P 5/15 (2006.01)
- F02D 15/00 (2006.01)
- F02M 26/23 (2016.01)
- F02D 41/38 (2006.01)

(52) U.S. Cl.
CPC .......... *F02B 23/10* (2013.01); *F02D 13/0261* (2013.01); *F02D 13/0265* (2013.01); *F02D 15/00* (2013.01); *F02D 41/0007* (2013.01); *F02D 41/0047* (2013.01); *F02D 41/401* (2013.01); *F02D 41/402* (2013.01); *F02P 5/045* (2013.01); *F02P 5/15* (2013.01); *F02D 41/0057* (2013.01); *F02D 41/403* (2013.01); *F02D 41/405* (2013.01); *F02D 2041/001* (2013.01); *F02D 2041/389* (2013.01); *F02M 26/23* (2016.02)

(56) References Cited

U.S. PATENT DOCUMENTS

| | | | |
|---|---|---|---|
| 6,609,493 B2 * | 8/2003 | Yamaguchi | F02D 41/005 123/299 |
| 6,968,825 B2 | 11/2005 | Hitomi et al. | |
| 7,168,420 B1 * | 1/2007 | Yang | F02D 41/003 123/568.15 |
| 7,234,438 B2 * | 6/2007 | Yang | F02B 11/00 123/295 |
| 7,240,659 B2 * | 7/2007 | Yang | F02D 35/025 123/295 |
| 8,544,444 B2 * | 10/2013 | Hitomi | F02D 41/3047 123/294 |
| 9,328,688 B2 * | 5/2016 | Hitomi | F02D 41/402 |
| 9,863,372 B2 * | 1/2018 | Fujimoto | F02D 41/0025 |
| 10,247,156 B2 * | 4/2019 | Sakai | F02M 67/12 |
| 10,480,395 B2 * | 11/2019 | Matsumoto | F02P 5/045 |
| 10,487,720 B2 * | 11/2019 | Inoue | F02D 41/402 |
| 10,519,882 B2 * | 12/2019 | Tsuda | F02D 41/0042 |
| 10,641,188 B2 * | 5/2020 | Inoue | F02D 35/028 |
| 10,648,443 B1 * | 5/2020 | Inoue | F02D 41/3041 |
| 10,677,185 B2 * | 6/2020 | Inoue | F02D 23/02 |
| 10,677,187 B2 * | 6/2020 | Matsumoto | F02B 1/08 |
| 10,697,391 B2 * | 6/2020 | Inoue | F02D 41/0052 |
| 10,711,708 B2 * | 7/2020 | Matsumoto | F02D 41/26 |
| 2002/0059914 A1 * | 5/2002 | Yamaguchi | F02D 41/3041 123/299 |
| 2007/0062483 A1 * | 3/2007 | Yang | F02D 41/3041 123/295 |
| 2007/0062486 A1 * | 3/2007 | Yang | F02B 11/00 123/305 |
| 2007/0233354 A1 * | 10/2007 | Yang | F02D 35/025 701/104 |
| 2010/0242899 A1 * | 9/2010 | Hitomi | F02D 35/023 123/299 |
| 2010/0242900 A1 * | 9/2010 | Hitomi | F02D 41/402 123/299 |
| 2011/0120416 A1 * | 5/2011 | Lamping | F02D 19/087 123/445 |
| 2013/0152901 A1 | 6/2013 | Shishime et al. | |
| 2013/0327293 A1 * | 12/2013 | Dieler | F02D 41/3041 123/406.12 |
| 2017/0022924 A1 * | 1/2017 | Fujimoto | F02M 25/0224 |
| 2018/0216592 A1 * | 8/2018 | Sakai | F02D 41/3041 |
| 2018/0306131 A1 * | 10/2018 | Tsuda | F02D 41/40 |
| 2018/0334949 A1 * | 11/2018 | Inoue | F02B 9/02 |
| 2018/0334989 A1 * | 11/2018 | Inoue | F02D 41/402 |
| 2019/0063303 A1 * | 2/2019 | Matsumoto | F02B 23/101 |
| 2019/0063337 A1 * | 2/2019 | Inoue | F02B 7/00 |
| 2019/0063338 A1 * | 2/2019 | Matsumoto | F02D 41/401 |
| 2019/0063344 A1 * | 2/2019 | Matsumoto | F02D 41/3029 |
| 2019/0063360 A1 * | 2/2019 | Inoue | F02D 41/3047 |
| 2019/0063361 A1 * | 2/2019 | Yamaguchi | F02B 31/085 |
| 2019/0093575 A1 * | 3/2019 | Inoue | F02B 37/16 |
| 2019/0093592 A1 * | 3/2019 | Matsumoto | F02B 11/00 |
| 2019/0101071 A1 * | 4/2019 | Inoue | F02D 37/02 |
| 2019/0226411 A1 * | 7/2019 | Shishime | F02D 35/027 |
| 2019/0226421 A1 * | 7/2019 | Shishime | F02D 41/405 |
| 2020/0141348 A1 * | 5/2020 | Matsumoto | F02D 41/0002 |
| 2020/0141377 A1 * | 5/2020 | Inoue | F02B 23/02 |

FOREIGN PATENT DOCUMENTS

| | | | | |
|---|---|---|---|---|
| JP | H10205362 A | 8/1998 | | |
| JP | 2005325818 A | 11/2005 | | |
| JP | 2007292065 A | 11/2007 | | |
| JP | 4082292 B2 | 4/2008 | | |
| JP | 2010236477 A | 10/2010 | | |
| JP | 2012041899 A | 3/2012 | | |
| JP | 2012241590 A * | 12/2012 | ......... | F02D 41/3041 |
| JP | 2012241590 A | 12/2012 | | |
| JP | 5447435 B2 | 3/2014 | | |
| JP | 2014152619 A | 8/2014 | | |
| JP | 2015034474 A | 2/2015 | | |

OTHER PUBLICATIONS

Xie, H. et al., "Study on spark assisted compression ignition (SACI) combustion with positive valve overlap at medium-high load," Journal of Applied Energy, Aug. 3, 2012, 12 pages.

Urushihara, T. et al., "A Study of a Gasoline-Fueled Compression Ignition Engine ~ Expansion of the HCCI Operation Range Using SI Combustion as a Trigger of Compression Ignition ~," SAE Technical Paper Series, Apr. 11, 2005, 9 pages.

* cited by examiner

PREMIXED COMPRESSION IGNITION TYPE ENGINE WITH SUPERCHARGING SYSTEM

TECHNICAL FIELD

The technique disclosed herein relates to premixed compression ignition type engines with a supercharging system.

BACKGROUND ART

Patent Document 1 discloses an engine that burns an air-fuel mixture in a combustion chamber by compression ignition in a predetermined low load, low rotational speed region. This engine burns the air-fuel mixture by spark ignition in a region in which the load is higher than in the predetermined region and in a region in which the rotational speed is higher than in the predetermined region. In this engine, a spark plug performs spark ignition near the compression top dead center even in the predetermined region to facilitate compression ignition of the air-fuel mixture.

Patent Document 2 discloses an engine that burns an air-fuel mixture in a combustion chamber by compression ignition in a high load region. In this engine, in a high load, high rotational speed region, a small amount of fuel is injected to assist ignition between an early stage injection and a late stage injection for forming an air-fuel mixture for compression ignition combustion, whereby a rich air-fuel mixture is formed near a spark plug. As the spark plug ignites the nearby rich air-fuel mixture to form a flame, an air-fuel mixture produced by the early stage injection is compression ignited, and an air-fuel mixture produced by the latter injection that is performed simultaneously with the compression ignition is subsequently compression ignited.

Patent Document 3 discloses an engine with a supercharging system which increases torque by supercharging a gas in an intake passage. In this engine, the opening timing of an intake valve is significantly retarded. Namely, the opening timing of the intake valve is set to a crank angle of 65° or more after the bottom dead center. The temperature in the combustion chamber at the compression top dead center is thus reduced to effectively reduce knocking, etc.

Patent Document 4 discloses an engine including a variable valve train mechanism (variable intake mechanism) that can change at least the opening timing of an intake valve. In this engine, the variable valve train mechanism is controlled so that an overlap period (overlap amount) during which both intake and exhaust valves are open sequentially changes in a first region that is set in a partial load range, a second region in which the load is higher than in the first region, and a third region in which the load is higher than in the second region.

Specifically, in the engine of Patent Document 4, the overlap period is set to a larger value when the engine body is operating in the first region and the third region than when the engine body is operating in the second region. Accordingly, in the first region, a larger amount of burned gas remains in the combustion chamber by internal exhaust g recirculation (EGR), whereby pumping loss is reduced. In the second region, an increase in temperature in the combustion chamber is reduced, whereby the possibility of abnormal combustion such as knocking is reduced or eliminated. In the third region, scavenging is performed. Namely, a gas in an intake passage flows through the combustion chamber into an exhaust passage to cause a burned gas remaining in the combustion chamber to flow out of the combustion chamber into the exhaust passage. The possibility of abnormal combustion such as knocking is thus reduced or eliminated.

CITATION LIST

Patent Document

PATENT DOCUMENT 1: Japanese Patent No. 4082292
PATENT DOCUMENT 2: Japanese Patent No. 5447435
PATENT DOCUMENT 3: Japanese Unexamined Patent Publication No. H07-145740
PATENT DOCUMENT 4: Japanese Unexamined Patent Publication No. 2014-152619

SUMMARY OF THE INVENTION

Technical Problem

The above conventional engines that perform combustion by compression ignition generate relatively loud combustion noise. For example, when the engine performs combustion by compression ignition while operating in the high load region including a full open load, combustion noise may become louder than an acceptable value.

The technique disclosed herein was developed in view of the foregoing, and it is an object of the technique to perform combustion with compression ignition in a premixed compression ignition type engine while reducing combustion noise to a value equal to or less than the acceptable value.

Solution to the Problem

The inventors considered a combustion mode combining spark ignition (SI) combustion and compression ignition (CI) combustion. The SI combustion is combustion with flame propagation which is started by forcibly igniting an air-fuel mixture in a combustion chamber. The CI combustion is combustion that is started by an air-fuel mixture in a combustion chamber being compressed and self-ignited. The combustion mode combining the SI combustion and the CI combustion is a mode in which an air-fuel mixture in a combustion chamber is forcibly ignited to start combustion by flame propagation, and an unburned air-fuel mixture in the combustion chamber is burned by compression ignition due to a pressure increase caused by heat generation and flame propagation of the SI combustion. This mode is hereinafter referred to as spark controlled compression ignition (SPCCI) combustion.

In combustion by compression ignition, the timing of compression ignition changes significantly if the temperature in the combustion chamber before the start of compression varies. In the SPCCI combustion, variation in temperature in the combustion chamber before the start of compression can be absorbed by adjusting the amount of heat that is generated by the SI combustion. The timing of compression ignition can be controlled by adjusting the start timing of the SI combustion by adjustment of the ignition timing, etc. according to the temperature in the combustion chamber before the start of compression. That is, in the SPCCI combustion, the CI combustion can be controlled by the SI combustion.

In the case where the geometric compression ratio is as high as over 12:1 in order to obtain high torque in an engine that performs the SPCCI combustion, a larger amount of fuel is injected and the temperature in the combustion chamber is higher when the engine body is in a high load operating state. Accordingly, if fuel is injected into the combustion chamber at a relatively early timing, the chemical reaction of the air-fuel mixture proceeds during a period from the fuel injection to ignition, and abnormal combustion such as pre-ignition and knocking may occur during the compression stroke.

In the case where the geometric compression ratio is as high as over 12 in order to obtain high torque in an engine that performs the SPCCI combustion, a larger amount of fuel is injected and the temperature in the combustion chamber is higher when the engine body is in a high load operating state. Accordingly, if fuel is injected into the combustion chamber at a relatively early timing, the chemical reaction of the air-fuel mixture proceeds during a period from the fuel injection to ignition, and abnormal combustion such as pre-ignition and knocking may occur during the compression stroke.

One possible way to reduce such abnormal combustion is to significantly reduce the effective compression ratio when the engine body is in the high load operating state. In order to improve the efficiency of the engine, it is desirable to perform compression ignition at an appropriate timing in the expansion stroke. Accordingly, if the effective compression ratio is reduced, compression ignition may not be performed in the expansion stroke in which the pressure in the compression chamber is reduced. Moreover, high torque cannot be obtained for the engine body. That is, when the load of the engine body is high, high torque is required according to the load. However, sufficiently high torque cannot be obtained even through there is the potential for higher torque due to the high geometric compression ratio.

In the technique disclosed herein, in a high load region of an operation region in which the SPCCI combustion is performed, an acceptable amount of reduction in effective compression ratio with respect to the geometric compression ratio of the engine body is reduced and fuel is injected in the compression stroke.

Specifically, the technique disclosed herein relates to a premixed compression ignition type engine with a supercharging system which performs a four-stroke operation of an intake stroke, a compression stroke, an expansion stroke, and an exhaust stroke while a piston reciprocates twice in a cylinder. This engine includes: an engine body having a combustion chamber on a crown surface side of the piston in the cylinder; an ignition device disposed in the combustion chamber; a fuel injection device disposed so as to face the inside of the combustion chamber; a supercharging system disposed in an intake passage through which a gas to be introduced into the combustion chamber flows; and a control unit that is connected to the ignition device, the fuel injection device, and the supercharging system and outputs control signals to the ignition device, the fuel injection device, and the supercharging system. A geometric compression ratio of the engine body is set to 13:1 or more.

When the engine body operates in a preset high load region, the control unit sets an effective compression ratio of the engine body to 12:1 or more with a difference from the geometric compression ratio being within 2 so that, after an air-fuel mixture formed by air and fuel mixed in the combustion chamber is ignited by the ignition device and burned by flame propagation, an unburned air-fuel mixture in the combustion chamber is burned by compression ignition, and the control unit also outputs the control signal to the supercharging system to supercharge the gas to be introduced into the combustion chamber, outputs the control signal to the fuel injection device to inject fuel in the compression stroke (preferably in the second half of the compression stroke), and outputs the control signal to the ignition device to ignite the air-fuel mixture in the combustion chamber before a compression top dead center after the fuel injection is finished.

As used herein, the "engine" is a four-stroke engine that operates by repeating the intake stroke, the compression stroke, the expansion stroke, and the exhaust stroke in a combustion chamber. The "high load region" may be, e.g., a high load region including a full open load in an operation region determined by the rotational speed and load of the engine body. The "second half of the compression stroke" is the second half when the period of the compression stroke is divided into two halves, namely the first and second halves. The expression "inject fuel in the compression stroke" means that fuel is injected in the compression stroke and may also be injected at a timing other than the compression stroke. Any amount of fuel may be injected at a timing other than the compression stroke as long as abnormal combustion such as pre-ignition does not occur before ignition.

With this configuration, when the engine body is operating in the high load region, fuel is injected in the compression stroke while supercharging a gas introduced in the combustion chamber, and the air-fuel mixture is ignited before the compression top dead center after the fuel injection is finished. The SI combustion of the air-fuel mixture is thus started by flame propagation, and the CI combustion of an unburned air-fuel mixture is subsequently started by compression ignition due to the heat generation and pressure increase in the SI combustion.

In the SPCCI combustion, the effective compression ratio of the engine body is set to 12:1 or more with a difference from the geometric compression ratio of the engine body being within 2. The effective compression ratio is thus reduced with respect to the geometric compression ratio of the engine body by a smaller amount, and a gas introduced into the combustion chamber is supercharged. Accordingly, compression ignition can be reliably performed in the expansion stroke in which the pressure in the combustion chamber is reduced. Moreover, there is a potential for higher torque because of the relatively high geometric compression ratio, and high torque required when the load of the engine body is high can be obtained by exploiting this potential.

When performing the SPCCI combustion in the high load region, fuel is injected at least in the compression stroke. Injecting fuel in the compression stroke restrains the chemical reaction of the air-fuel mixture from proceeding after the fuel injection and before ignition. The possibility of abnormal combustion such as pre-ignition and knocking during the compression stroke is thus reduced or eliminated. The CI combustion is thus appropriately performed even in the high load region in which high torque is required. As a result, combustion noise is reduced, and both improved fuel efficiency performance and higher torque are achieved.

The engine may further include an external EGR system having an EGR passage and connected to the control unit, the EGR passage connecting an exhaust passage through which a burned gas discharged from the combustion chamber flows and the intake passage. In this case, it is preferable that, when the engine body operates in the high load region, the control unit output a control signal to the external EGR system to reduce the temperature of a part of the burned gas flowing in the exhaust passage and then cause the part of the burned gas to flow back into the intake passage as an EGR gas to introduce the EGR gas into the combustion chamber.

With this configuration, when the engine body operates in the high load region, the EGR gas having a reduced temperature (burned gas) is returned into the intake passage and introduced into the combustion chamber. As described above, when the EGR gas, which is an inert gas, is introduced into the combustion chamber, the EGR gas has a reduced thermal influence on the combustion chamber as it has a reduced temperature. Accordingly, although the temperature in the combustion chamber typically tends to increase in the high load region, the temperature in the combustion chamber can be reduced by introducing the EGR gas therein. This is advantageous in reducing or eliminating the possibility of abnormal combustion such as pre-ignition and knocking during the combustion stroke.

When the EGR gas is introduced into the combustion chamber in a naturally aspirated state, the oxygen concentration in the combustion chamber reduces according to the proportion of the EGR gas to the total amount of gas in the combustion chamber. However, in the high load region in which the EGR gas is introduced into the combustion chamber, the gas to be introduced into the combustion chamber is supercharged as described above. The oxygen concentration in the combustion chamber can thus be adjusted to the concentration required according to the load of the engine body.

Since the EGR gas has a reduced temperature, the density of the gas introduced into the combustion chamber is increased and the charging efficiency is improved. Moreover, as the EGR gas having a reduced temperature is introduced into the combustion chamber, the oxygen concentration in the combustion chamber can be adjusted without depending on a throttle valve provided in the intake passage. Pumping loss is thus reduced. In addition, the combustion temperature in the combustion chamber is reduced, whereby cooling loss is also reduced. The fuel efficiency of the engine is thus improved.

It is preferable that, when the engine body operates in the high load region, the control unit output the control signal to the external EGR system so that a proportion of the EGR gas to a total amount of gas that is introduced into the combustion chamber is 25% to 35% by mass.

When the engine body operates in the high load region, the fuel efficiency of the engine is expected to improve until the proportion of the EGR gas to the total amount of gas that is introduced into the combustion chamber increases to 25% by mass. In this range of the proportion, the higher the proportion is, the more the fuel efficiency of the engine is expected to improve. When the proportion becomes larger than 35% by mass, however, SI combustion becomes abruptly unstable and therefore improvement in fuel efficiency of the engine is hardly expected. With the above configuration, the proportion of the EGR gas is 25% or more and 35% or less by mass. The fuel efficiency of the engine is therefore suitably improved.

The engine may further include a variable valve train mechanism provided in the engine body and connected to the control unit. In this case, it is preferable that, when the engine body operates in the high load region, the control unit output a control signal to the variable valve train mechanism to provide an overlap period during which both an intake valve that opens and closes an intake port of the engine body and an exhaust valve that opens and closes an exhaust port of the engine body are open.

With the above configuration, when the engine body operates in the high load region, the opening period of the intake valve and the opening period of the exhaust valve overlap each other. Since the gas to be introduced into the combustion chamber is being supercharged, the gas in the intake passage flows through the combustion chamber of the engine body into the exhaust passage during the overlap period during which both the intake valve and the exhaust valve are open. The burned gas remaining in the combustion chamber is thus caused to flow out of the combustion chamber into the exhaust passage and is scavenged.

When the gas (burned gas) remaining in the combustion chamber is scavenged, the combustion chamber can be charged with a larger amount of fresh air, whereby the charging efficiency of fresh air is improved. Higher torque of the engine is thus achieved. The gas that flows through the combustion chamber by the scavenging is cooler than the gas remaining in the combustion chamber. The temperature in the combustion chamber is thus reduced, which is advantageous in reducing or eliminating the possibility of abnormal combustion such as pre-ignition and knocking in the compression stroke.

When the engine body operates in the high load region, the control unit may output the control signal to the fuel injection device to perform a first injection in a period from the intake stroke to the first half of the compression stroke and perform a second injection in the compression stroke after the first injection.

When the engine body operates in the high load region, a larger amount of fuel is injected into the combustion chamber. Accordingly, if a relatively large amount of fuel required in the high load region is injected at a time in the second half of the compression stroke, the time for vaporization from injection of the fuel to ignition is short for the amount of fuel. Accordingly, the fuel (air-fuel mixture) is not sufficiently mixed. Unburned fuel loss is increased, and fuel efficiency is reduced. Moreover, smoke (soot) may be generated.

With the above configuration, when the engine body operates in the high load region, the first injection is performed in the period from the intake stroke to the first half of the compression stroke, and the second injection is performed after the first injection. When the fuel injection is thus performed a plurality of times, the time for vaporization from injection of the fuel to ignition is long enough for the fuel injected in the first injection. The fuel injected in the first injection is thus sufficiently mixed. Since the fuel is injected in the first injection, the amount of fuel that is required to be injected in the second injection is reduced by the amount of fuel injected in the first injection. Accordingly, the fuel injected in the second injection is sufficiently mixed even through the time for vaporization from injection of the fuel to ignition is short. The unburned fuel loss is thus reduced, and the fuel efficiency is improved. Generation of soot is also reduced.

The geometric compression ratio of the engine body may be set to 15:1 or more.

Increasing the geometric compression ratio of the engine body is advantageous in stabilizing combustion by compression ignition but facilitates abnormal combustion such as pre-ignition and knocking. Even in the engine in which the geometric compression ratio is 15:1 or more, injecting fuel in the compression stroke when the engine body operates in the high load region stabilizes combustion by compression ignition while avoiding such abnormal combustion.

The engine may be an engine that injects fuel containing gasoline by the fuel injection device.

Combustion of the fuel containing gasoline may cause abnormal combustion such as pre-ignition and knocking in the combustion chamber having a high temperature. Even in the engine using such fuel containing gasoline, injecting the fuel in the compression stroke when the engine body operates in the high load region stabilizes combustion by compression ignition while avoiding such abnormal combustion.

The effective compression ratio of the engine body may be adjusted by the closing timing of the intake valve at which the piston starts compression of the gas in the cylinder. In this case, when the engine body operates in the high load region, the control unit may output a control signal to the variable valve train mechanism to set the effective compression ratio of the engine body to 12:1 or more with a difference from the geometric compression ratio being within 2.

When the engine includes the variable valve train mechanism, it is preferable that, when the engine body operates in a preset low load region, the control unit output the control signal to the supercharging system so as not to supercharge the gas in the intake passage which is to be introduced into the combustion chamber, and when the engine body operates in the preset high load region, the control unit output the control signal to the supercharging system to supercharge the gas in the intake passage which is to be introduced into the combustion chamber. It is preferable that, when the engine body operates in a region from the low load region to the high load region, the control unit output the control signal to the variable valve train mechanism to adjust the opening timing of the intake valve that opens and closes the intake port so that an overlap period during which both the intake valve and the exhaust valve that opens and closes the exhaust port of the engine body are open is equal to or longer than a predetermined crank angle range and to adjust the closing timing of the intake valve so that the effective compression ratio of the engine body is within 2 of the geometric compression ratio of the engine body.

As used herein, the "low load region" may be, e.g., a low load region including an idle operation in an operation region determined by the rotational speed and load of the engine body.

When the engine body operates in the low load region, the temperature in the combustion chamber at the time the piston reaches the combustion top dead center, namely the compression end temperature, needs to be increased in order to improve stability of combustion of the air-fuel mixture in the combustion chamber. In order to increase the compression end temperature, it is effective to perform internal EGR, namely to return the exhaust gas into the combustion chamber so that the burned gas remains in the combustion chamber. When the engine body operates in the high load region, the compression end temperature needs to be reduced in order to increase the effective combustion ratio and increase expansion work. In order to reduce the compression end temperature, it is effective to perform scavenging, namely to cause the burned gas remaining in the combustion chamber to flow out of the combustion chamber into the exhaust passage.

The engine disclosed in Patent Document 4 can perform such internal EGR in the low load region and scavenging in the high load region. In this engine, however, the overlap period is changed by changing the opening and closing timings of the intake valve according to the load of the engine body. Accordingly, when the load of the engine body changes abruptly such as when the accelerator pedal is depressed to a large extent, the opening and closing timings of the intake value are not responsively changed. The operation of changing the overlap period is therefore not responsively controlled, making it difficult to control the overlap period according to the load of the engine body. This causes reduced combustion stability and reduced expansion work, resulting in reduction in fuel efficiency and reduction in torque.

The engine with a supercharging system disclosed in Patent Document 3 also has the problems of reduction in fuel efficiency and reduction in torque when internal EGR and scavenging are performed by changing the opening and closing timings of the intake valve according to the load of the engine body.

With the above configuration, when the engine body operates in the low load region, the gas in the intake passage is not supercharged and the overlap period equal to or longer than the predetermined crank angle range is provided. Since the gas in the intake passage is not supercharged, the gas pressure in the intake passage is relatively low. Accordingly, internal EGR, namely an operation of returning the exhaust gas discharged into the intake port or the exhaust port back into the combustion chamber, is performed during the overlap period. The hot burned gas thus remains in the combustion chamber. The hot burned gas remaining in the combustion chamber contributes to an increase in temperature in the combustion chamber before the start of compression. Accordingly, performing the internal EGR in the low load region increases the compression end temperature and improves combustion stability.

When the engine body operates in the high load region, the gas in the intake passage is supercharged and the overlap period equal to or longer than the predetermined crank angle range is provided. Since the gas in the intake passage is supercharged, the gas pressure in the intake passage is relatively high. Accordingly, the gas in the intake passage flows through the combustion chamber of the engine body into the exhaust passage during the overlap period. The burned gas remaining in the combustion chamber is thus caused to flow out of the combustion chamber into the exhaust passage and is thus scavenged.

As described above, the hot gas (burned gas) remaining in the combustion chamber increases the temperature in the combustion chamber before the start of compression. Accordingly, the gas density is reduced, and the effective compression ratio is slightly reduced, thereby causing reduction in expansion work. In the high load region, the gas remaining in the combustion chamber is scavenged as described above. Accordingly, the compression end temperature is reduced, and the effective compression ratio is increased, whereby expansion work is increased.

When the engine body operates in the region from the low load region to the high load region, the closing timing of the intake valve is adjusted so that the effective compression ratio of the engine body is within 2 of the geometric compression ratio of the engine body. Since the effective compression ratio of the engine body is reduced with respect to the geometric compression ratio of the engine body by a smaller amount, higher torque of the engine body is obtained by exploiting the potential for higher torque due to the relatively high geometric compression ratio.

As described above, in the engine with the supercharging system, the internal EGR is performed in the low load region and the scavenging is performed in the high load region even without significantly changing the opening timing and the closing timing of the intake valve, namely by switching whether the gas in the intake passage is supercharged or not. Accordingly, even when the load of the engine body changes suddenly, switching between the internal EGR and the scavenging is performed responsively, whereby a sufficient effective compression ratio is obtained and torque is increased. Both improved fuel efficiency and increased torque are therefore achieved.

When the engine body operates in the high load region, the control unit may output the control signal to the variable valve train mechanism to set the overlap period to a crank angle of 40 degrees or more, the overlap period being a period from an opening timing defined as a timing at which a lift of the intake valve is 0.3 mm to a closing timing defined as a timing at which a lift of the exhaust valve is 0.3 mm.

When the engine body operates in the region from the low load region to the high load region, the control unit may output the control signal to the variable valve train mechanism to set the opening and closing timings of the intake valve to a fixed or substantially fixed timing within a crank angle range of ±5°.

With this configuration, when the engine body operates in the region from the low load region to the high load region, the opening and closing timings of the intake valve are fixed or substantially fixed and are hardly changed. As a result, when the load of the engine body changes suddenly, the above specific effect is obtained. Namely, switching between the internal EGR and the scavenging is responsively performed, whereby improved fuel efficiency and increased torque are achieved.

The variable valve train mechanism may be a phase type variable valve train mechanism that can change the opening and closing timings of the intake valve while keeping a valve opening angle of the intake valve constant.

With this configuration, a phase type variable valve train mechanism is used as the variable valve train mechanism. The phase type variable valve train mechanism is a valve train mechanism with a simple configuration which does not change the opening timing and the lift of the intake valve. In this case, the engine that controls the overlap period is implemented by a simple configuration.

The supercharging system preferably includes a mechanical supercharger.

The mechanical supercharger is driven by rotation of the engine or a motor. The mechanical supercharger therefore has better control response than an exhaust turbine type supercharger that pressurize the gas in the intake passage by driving a compressor with a turbine that receives the exhaust flow. The use of the mechanical supercharger is therefore advantageous in responsively switching between the internal EGR and the scavenging when the load of the engine body changes suddenly.

When the engine body operates in the preset low load region, the control unit may also output the control signals to the ignition device and the fuel injection device so that, after the air-fuel mixture formed in the combustion chamber is ignited by the ignition device and burned by flame propagation, an unburned air-fuel mixture in the combustion chamber is burned by compression ignition.

In order to cause compression ignition of the air-fuel mixture in the combustion chamber, it is desirable not to reduce the effective compression ratio of the engine body too much with respect to the geometric compression ratio. Especially in the low load region, high torque is not required and therefore the effective compression ratio can be reduced. However, if the effective compression ratio is reduced too much, the compression end temperature is reduced, and the environment in the combustion chamber is not good for compression ignition. In this case, the effective compression ratio is reduced with respect to the geometric compression ratio of the engine body by a smaller amount, as described above. This improves the environment in the combustion chamber for compression ignition, which is advantageous for combustion by compression ignition.

Advantages of the Invention

The premixed compression ignition type engine with the supercharging system reduces combustion noise that is generated by combustion by compression ignition, and achieves both improved fuel efficiency and higher torque when the engine body operates in the high load region.

DESCRIPTION OF EMBODIMENTS

An exemplary embodiment of a premixed compression ignition type engine with a supercharging system will be described in detail with reference to the accompanying drawings.

Figure 1:
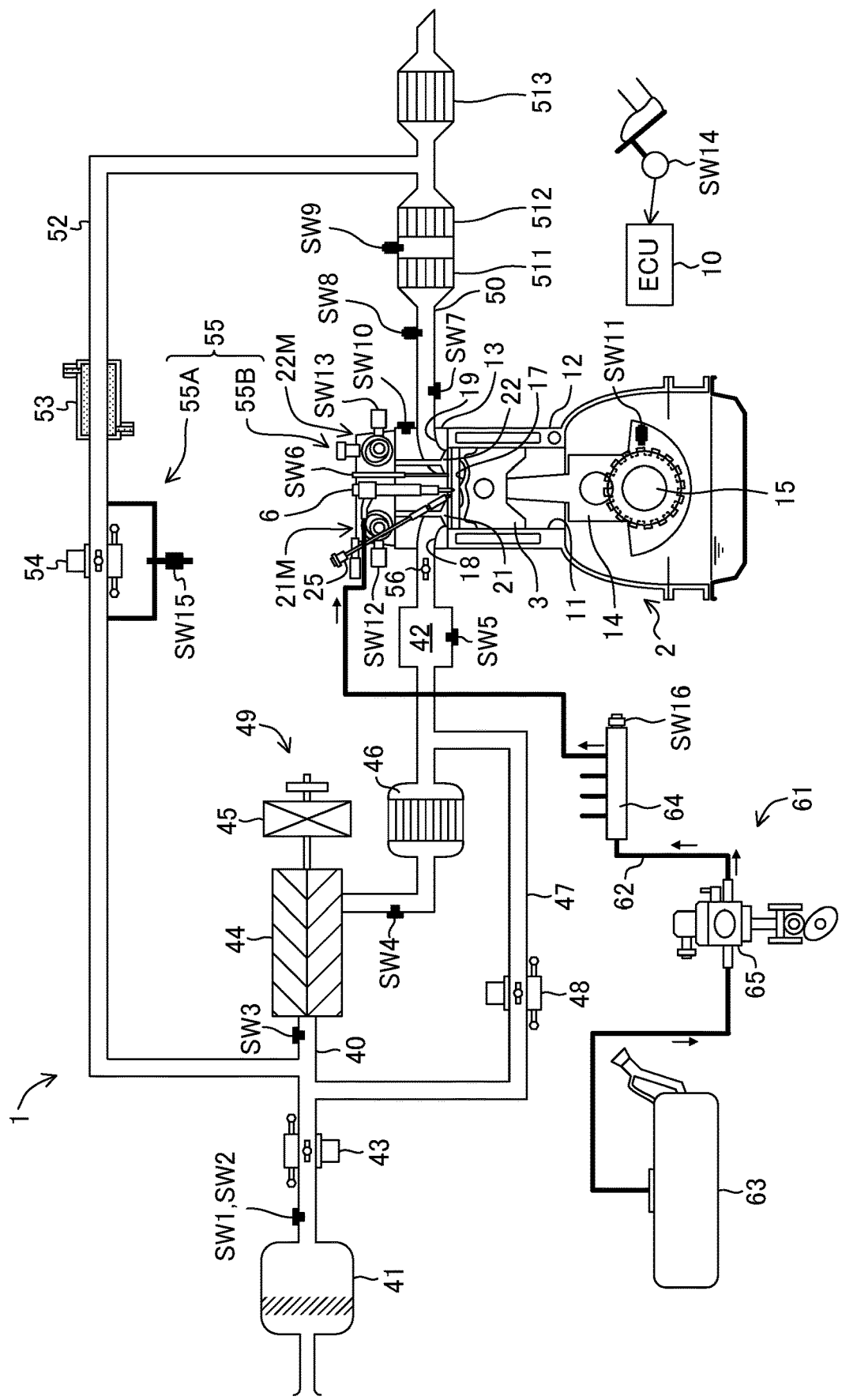
FIG. 1 illustrates a configuration of an engine.
Figure 2:
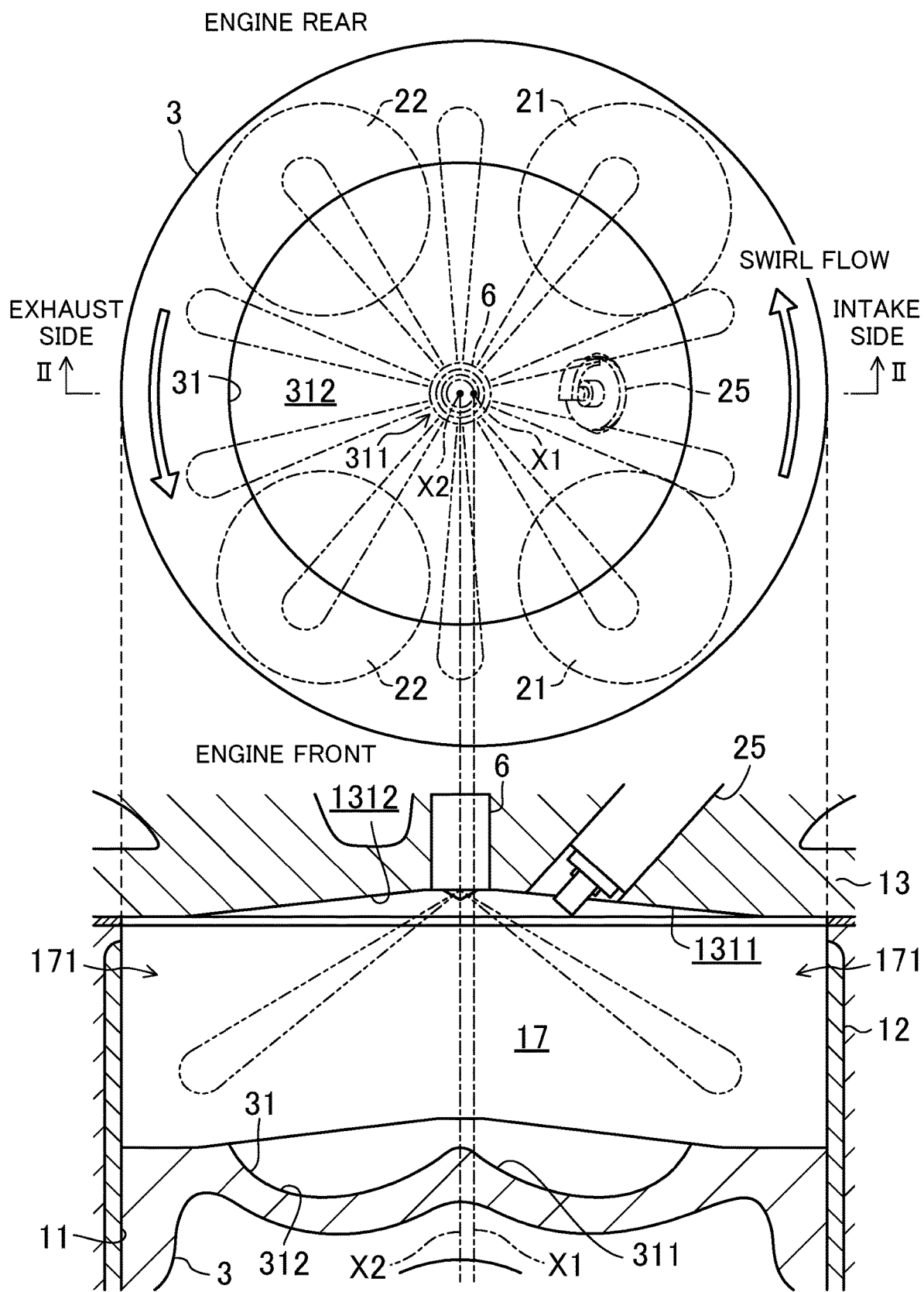
FIG. 2 illustrates a configuration of a combustion chamber.
Figure 3:
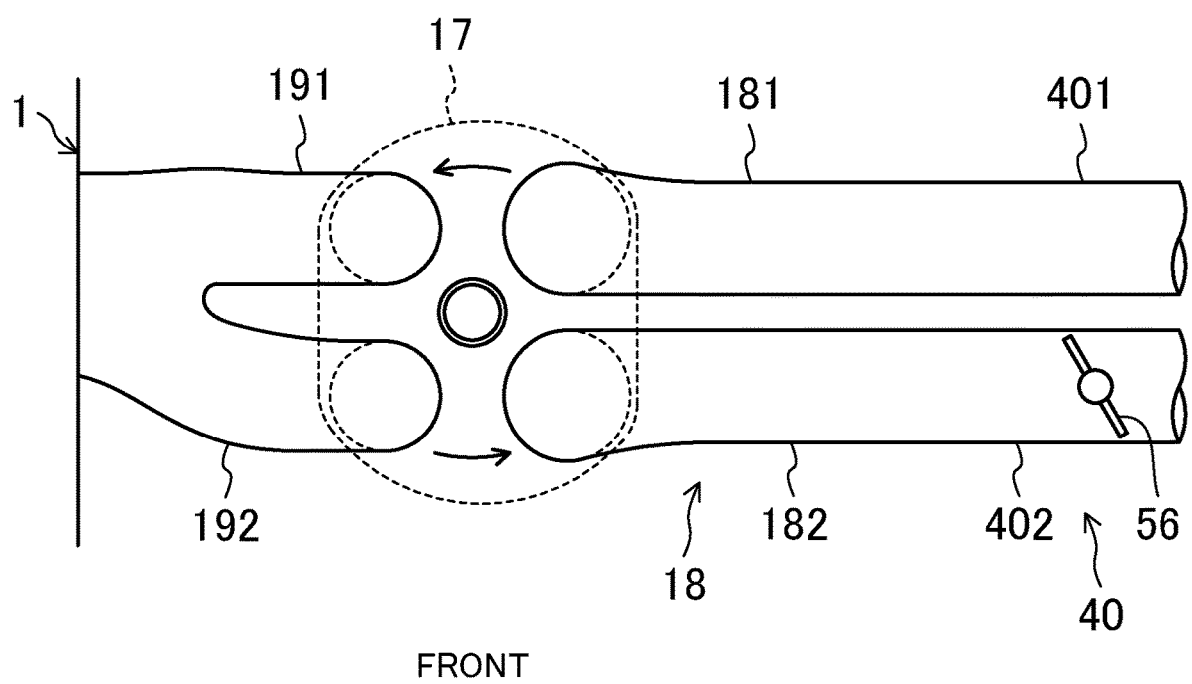
FIG. 3 is a plan view illustrating the configuration of the combustion chamber and an intake system.
Figure 4:
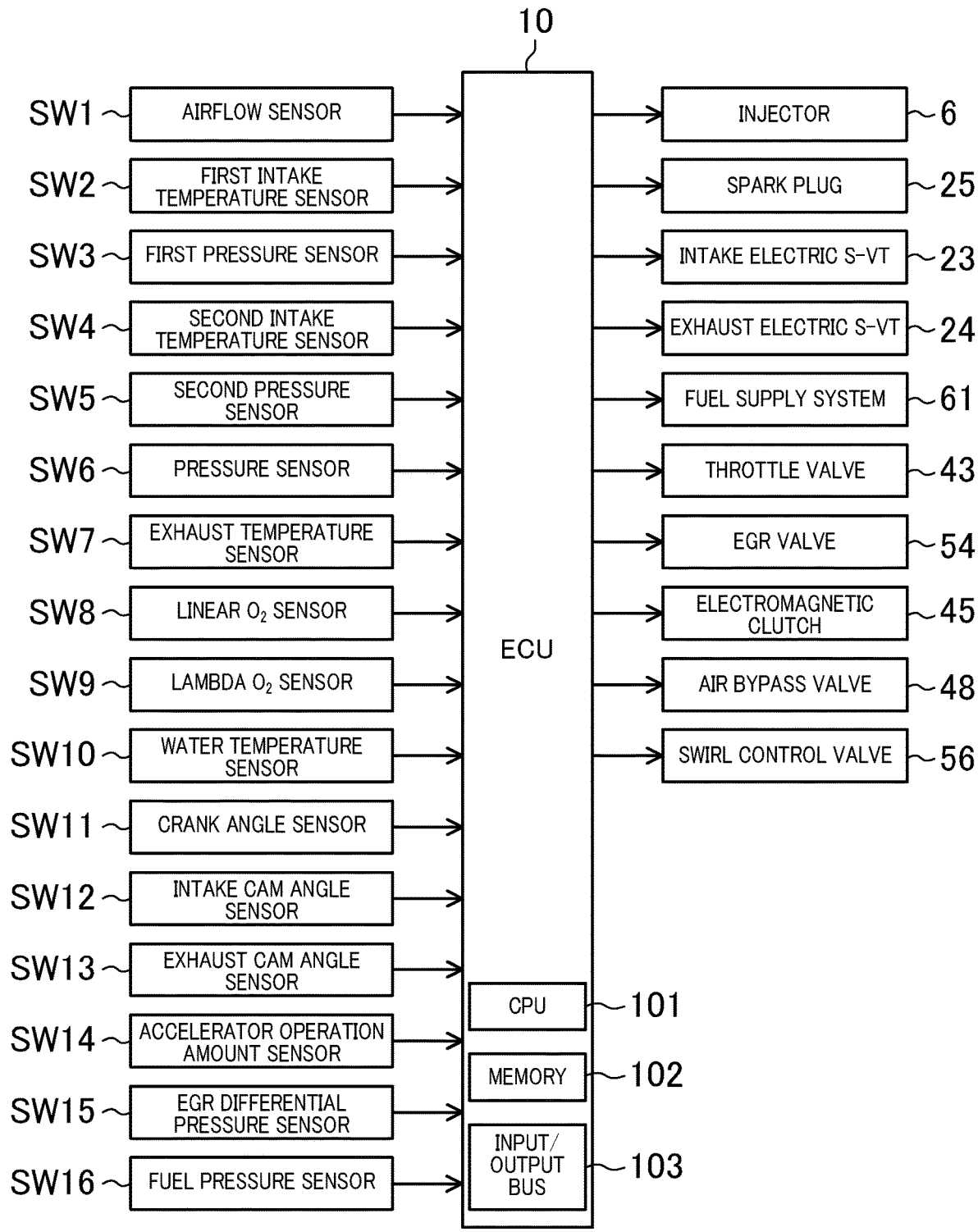
FIG. 4 is a block diagram illustrating the configuration of a control device for the engine.
Figure 5:
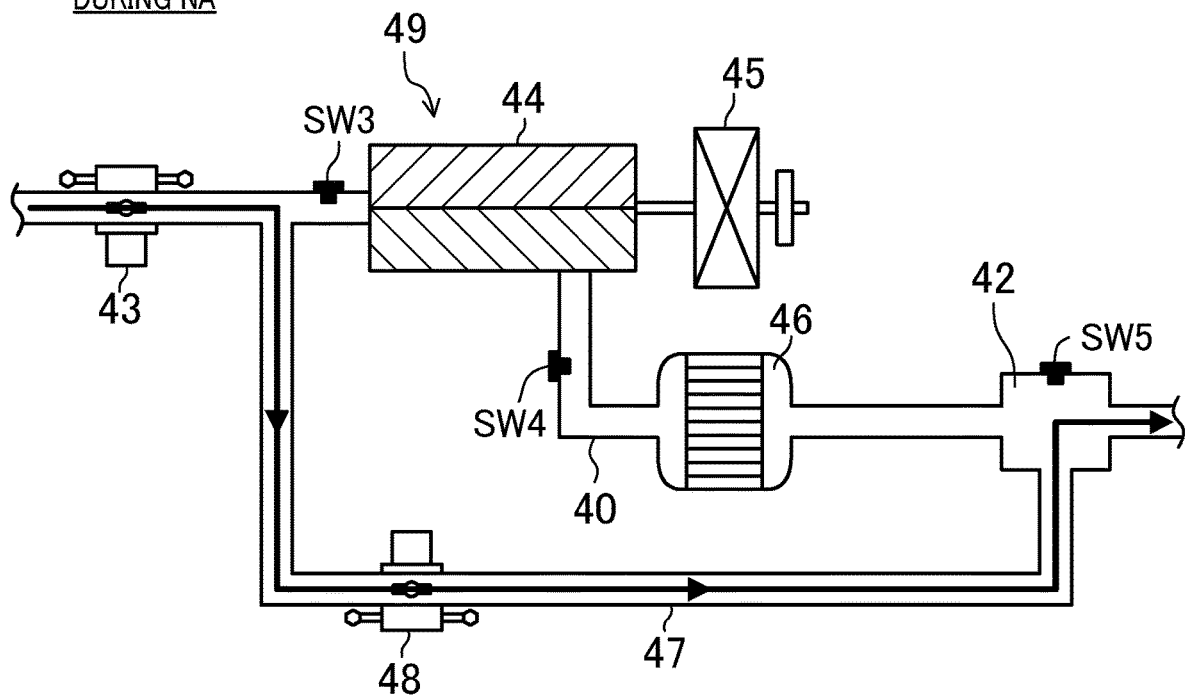
FIG. 5 illustrates how a gas flows in an intake passage when a supercharger is not driven.
Figure 6:
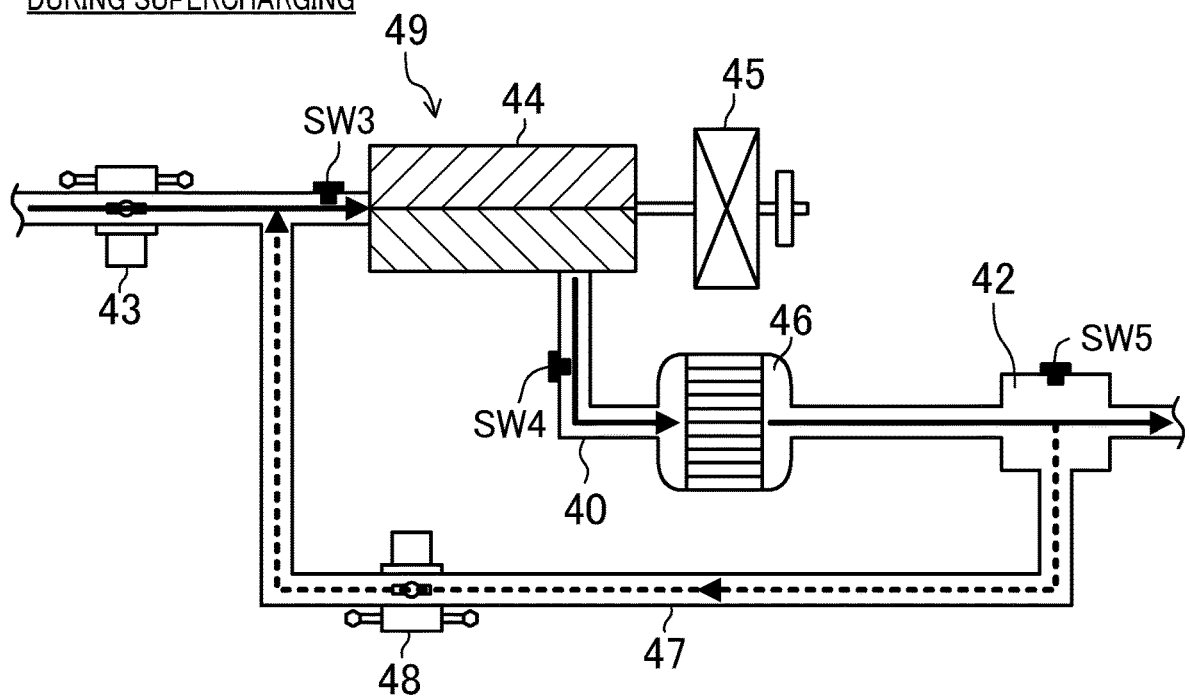
FIG. 6 illustrates how a gas flows in the intake passage when the supercharger is driven.

FIG. 1 illustrates the configuration of an engine 1. FIG. 2 illustrates the configuration of a combustion chamber 17. The combustion chamber 17 as viewed in plan is shown in the upper part of FIG. 2, and a sectional view taken along line II-II is shown in the lower part of FIG. 2. FIG. 3 illustrates the configuration of the combustion chamber 17 and an intake system. FIG. 4 is a block diagram illustrating the configuration of a control device for the engine 1. FIG. 5 illustrates how a gas flows in an intake passage 40 when a supercharger 44 is not driven. FIG. 6 illustrates how a gas flows in the intake passage 40 when the supercharger 44 is driven. The left side of FIG. 1 is the intake side, and the right side of FIG. 1 is the exhaust side. The left side of FIGS. 2 and 3 is the exhaust side, and the right side of FIGS. 2 and 3 is the intake side.

The engine 1 is a four-stroke engine that performs a four-stroke operation by repeating the intake stroke, the compression stroke, the expansion stroke, and the exhaust stroke in the combustion chamber 17. The engine 1 is mounted on a four-wheel vehicle. An automobile travels as the engine 1 operates. In this configuration example, fuel for the engine 1 is gasoline. The fuel may be gasoline containing bioethanol, etc. The fuel for the engine 1 may be any liquid fuel containing at least gasoline.

<Configuration of Engine>

The engine 1 is a multi-cylinder engine. As shown in FIG. 1, the engine 1 includes an engine body 2 having the combustion chamber 17. The engine body 2 includes a cylinder block 12 and a cylinder head 13 disposed on the cylinder block 12. A plurality of cylinders 11 are formed in the cylinder block 12. Only one cylinder 11 is shown FIGS. 1 and 2.

A piston 3 is slidably inserted in each cylinder 11. The piston 3 is connected to a crankshaft 15 via a connecting rod 14. In the four-stroke operation of the engine 1, the intake, compression, expansion, and exhaust strokes are performed while the piston 3 reciprocates twice in the cylinder 11. The piston 3 together with the cylinder 11 and the cylinder head 13 defines the combustion chamber 17.

As used herein, the "combustion chamber" is not limited to the meaning of the space that is present at the time the piston 3 reached the compression top dead center. The term "combustion chamber" may sometimes be used in a broad sense. That is, the "combustion chamber" may sometimes mean the space created by the piston 3, the cylinder 11, and the cylinder head 13 regardless of the position of the piston 3.

As shown in the lower part of FIG. 2, the lower surface of the cylinder head 13, namely the ceiling surface of the combustion chamber 17, is formed by a tilted surface 1311 and a tilted surface 1312. The tilted surface 1311 is an uphill slope from the intake side toward an injection axis X2 of an injector 6 described later. The tilted surface 1312 is an uphill slope from the exhaust side toward the injection axis X2. The ceiling surface of the combustion chamber 17 is what is called a pent-roof shape.

The upper surface of the piston 3 is raised toward the ceiling surface of the combustion chamber 17. A cavity 31 is formed in the upper surface of the piston 3. The cavity 31 is recessed from the upper surface of the piston 3. The cavity 31 faces the injector 6 described later. The center of the cavity 31 is offset toward the exhaust side with respect to a central axis X1 of the cylinder 11 and is aligned with the injection axis X2 of the injector 6.

The cavity 31 has a protruding portion 311. The protruding portion 311 is formed on the injection axis X2 of the injector 6. The protruding portion 311 has a substantially conical shape and extends upward from the bottom of the cavity 31 toward the ceiling surface of the combustion chamber 17. The cavity 31 has a symmetrical shape with respect to the injection axis X2 of the injector 6.

The cavity 31 also has a recessed portion 312 around the protruding portion 311. The recessed portion 312 is formed so as to surround the entire periphery of the protruding portion 311. The peripheral side surface of the recessed portion 312 is tilted with respect to the injection axis X2 from the bottom surface of the cavity 31 toward the opening of the cavity 31. The inside diameter of the cavity 31 in the recessed portion 312 gradually increases from the bottom of the cavity 31 toward the opening of the cavity 31.

The shape of the combustion chamber 17 is not limited to the shape illustrated in FIG. 2. That is, the shape of the cavity 31, the shape of the upper surface of the piston 3, the shape of the ceiling surface of the combustion chamber 17, etc. may be changed as appropriate. For example, the cavity 31 may have a symmetrical shape with respect to the central axis X1 of the cylinder 11. The tilted surface 1311 and the tilted surface 1312 may be symmetrical to each other with respect to the central axis X1 of the cylinder 11. The cavity 31 may have a shallow bottom portion shallower than the recessed portion 312 at a position facing a spark plug 25 described later.

The geometric compression ratio of the engine body 2 is set to 13:1 or more and 20:1 or less. As described later, the engine body 2 performs SPCCI combustion, which is a combination of SI combustion and CI combustion, in a part of the operation region. In the SPCCI combustion, CI combustion is performed using heat generation and a pressure increase in SI combustion. In the engine 1, the temperature in the combustion chamber 17 at the time the piston 3 reaches the compression top dead center for self-ignition of the air-fuel mixture, namely the compression end temperature, need not be increased.

That is, the engine 1 performs CI combustion, but its geometric compression ratio is set to a relatively low value. Reducing the geometric compression ratio is advantageous in reducing cooling loss and mechanical loss. The geometric compression ratio of the engine body 2 may be set to 14:1 or more and 17:1 or less in regular specifications (a fuel's octane number is about 91) and may be set to 15:1 or more and 18:1 or less in high-octane specifications (the fuel's octane number is about 96). In this configuration example, the geometric compression ratio of the engine body 2 is set to 15:1 or more.

The cylinder head 13 has an intake port 18 for each cylinder 11. As shown in FIG. 3, the intake port 18 has two intake ports, namely a first intake port 181 and a second intake port 182. The first intake port 181 and the second intake port 182 are arranged in the axial direction of the crankshaft 15, i.e., in the front-rear direction of the engine body 2. The intake port 18 communicates with the combustion chamber 17. Although not shown in detail, the intake port 18 is a so-called tumble port. That is, the intake port 18 has such a shape that a tumble flow is formed in the combustion chamber 17.

The intake port 18 is provided with an intake valve 21. The intake valve 21 opens and closes the intake port 18 between the combustion chamber 17 and the intake port 18. The engine body 2 is provide with a valve train mechanism 21M for the intake valve 21. The intake valve 21 is opened and closed at predetermined timings by the valve train mechanism 21M. The valve train mechanism 21M for the intake valve 21 is a variable valve train mechanism that can change the valve timing and/or the valve lift.

In this configuration example, the variable valve train mechanism 21M is a phase type variable valve train mechanism that can change the opening and closing timings of the intake valve 21 while keeping the valve opening angle of the intake valve 21 constant. As shown in FIG. 4, the variable valve train mechanism 21M includes an intake electric sequential-valve timing (S-VT) 23. The intake electric S-VT 23 is configured to continuously change the rotational phase of an intake camshaft within a predetermined angular range. The opening and closing timings of the intake valve 21 are thus continuously changed. The effective compression ratio of the engine body 2 is adjusted by the closing timing of the intake valve 21 at which the piston 3 starts compressing a gas in the cylinder 11. The valve train mechanism 21M for the intake valve 21 may include a hydraulic S-VT instead of the electric S-VT.

The cylinder head 13 further has an exhaust port 19 for each cylinder 11. As shown in FIG. 3, the exhaust port 19 also has two exhaust ports, namely a first exhaust port 191 and a second exhaust port 192. The first exhaust port 191 and the second exhaust port 192 are arranged in the front-rear direction of the engine body 2. The exhaust port 19 communicates with the combustion chamber 17.

The exhaust port 19 is provided with an exhaust valve 22. The exhaust valve 22 opens and closes the exhaust port 19 between the combustion chamber 17 and the exhaust port 19. The engine body 2 is provided with a valve train mechanism 22M for the exhaust valve 22. The exhaust valve 22 is opened and closed at predetermined timings by the valve train mechanism 22M. The valve train mechanism 22M for the exhaust valve 22 is a variable valve train mechanism that can change the valve timing and/or the valve lift.

In this configuration example, the variable valve train mechanism 22M is a phase type variable valve train mechanism that can change the opening and closing timings of the exhaust valve 22 while keeping the valve opening angle of the exhaust valve 22 constant. As shown in FIG. 4, the variable valve train mechanism 22M includes an exhaust electric S-VT 24. The exhaust electric S-VT 24 is configured to continuously change the rotational phase of an exhaust camshaft within a predetermined angular range. The opening and closing timings of the exhaust valve 22 are thus continuously changed. The valve train mechanism 22M for the exhaust valve 22 may include a hydraulic S-VT instead of the electric S-VT.

The engine 1 adjusts the length of an overlap period relating to the opening timing of the intake valve 21 and the closing timing of the exhaust valve 22 by the intake electric S-VT 23 and the exhaust electric S-VT 24. A hot burned gas is thus confined in the combustion chamber 17. That is, an internal exhaust gas recirculation (EGR) gas is introduced into the combustion chamber 17. A gas (burned gas) remaining in the combustion chamber 17 is also scavenged by adjusting the length of the overlap period. The overlap period is a period from the opening timing defined as the timing at which the lift of the intake valve 21 is 0.3 mm to the closing timing defined as the timing at which the lift of the exhaust valve 22 is 0.3 mm. For example, the overlap period is set to a crank angle of 40 degrees or more.

The injector 6 for each cylinder 11 is attached to the cylinder head 13. The injector 6 is configured to directly inject fuel into the combustion chamber 17. The injector 6 is an example of the fuel injection device. The injector 6 is disposed at the valley of the pent-roof shape where the tilted surface 1311 on the intake side and the tilted surface 1312 on the exhaust side meet such that the injector 6 faces the inside of the combustion chamber 17. The injector 6 faces the cavity 31.

As shown in FIG. 2, the injection axis X2 of the injector 6 is parallel to the central axis X1 of the cylinder 11 and is offset to the exhaust side with respect to the central axis X1 of the cylinder 11. The injection axis X2 of the injector 6 is aligned with the position of the protruding portion 311 of the cavity 31. The injection axis X2 of the injector 6 may be aligned with the central axis X1 of the cylinder 11. In this case as well, it is desirable that the injection axis X2 of the injector 6 be aligned with the position of the protruding portion 311 of the cavity 31.

Although not shown in detail, the injector 6 is a multi-hole fuel injection valve having a plurality of nozzle holes. As shown by long dashed double-short dashed lines in FIG. 2, the injector 6 injects fuel so that the fuel spray spreads radially from the center of the combustion chamber 17 and spreads obliquely downward from the ceiling portion of the combustion chamber 17.

In this configuration example, the injector 6 has ten nozzle holes. The nozzle holes are arranged equiangularly in the circumferential direction of the injector 6. As shown in the upper part of FIG. 2, the positions of the axes of the nozzle holes are offset in the circumferential direction of the injector 6 with respect to the spark plug 25 described later. That is, the spark plug 25 is sandwiched between the axes of the two nozzle holes adjacent to each other. This configuration avoids the fuel spray injected from the injector 6 from directly hitting the spark plug 25 and wetting electrodes of the spark plug 25.

A fuel supply system 61 is connected to the injector 6. The fuel supply system 61 includes a fuel tank 63 configured to store fuel and a fuel supply passage 62 connecting the fuel tank 63 and the injector 6. The fuel supply passage 62 is provided with a fuel pump 65 and a common rail 64. The fuel pump 65 pumps fuel to the common rail 64.

In this configuration example, the fuel pump 65 is a plunger pump that is driven by the crankshaft 15. The common rail 64 is configured to store the fuel pumped from the fuel pump 65 at a high fuel pressure. When the injector 6 is opened, the fuel stored in the common rail 64 is injected from the nozzle holes of the injector 6 into the combustion chamber 17.

The fuel supply system 61 is configured so that it can supply fuel having a pressure as high as 30 MPa to the injector 6. The maximum fuel pressure in the fuel supply system 61 may be, e.g., about 120 MPa. The pressure of fuel that is supplied to the injector 6 may be changed according to the operating state of the engine body 2. The configuration of the fuel supply system 61 is not limited to the above configuration.

The spark plug 25 for each cylinder 11 is attached to the cylinder head 13. The spark plug 25 forcibly ignites an air-fuel mixture in the combustion chamber 17. The spark plug 25 is an example of the ignition device.

In this configuration example, as is also shown in FIG. 2, the spark plug 25 is disposed on the intake side with respect to the central axis X1 of the cylinder 11 in the combustion chamber 17. The spark plug 25 is adjacent to the injector 6 and is located between the two intake ports. The spark plug 25 is attached to the cylinder head 13 so as to be tilted in such a direction that the lower end of the spark plug 25 is located closer to the center of the combustion chamber 17 than the upper end of the spark plug 25 is. The electrodes of the spark plug 25 face the inside of the combustion chamber 17 and are located near the ceiling surface of the combustion chamber 17.

The intake passage 40 is connected to one side surface of the engine body 2. The intake passage 40 communicates with the intake port 18 of each cylinder 11 and communicates with the combustion chamber 17 through the intake port 18. The intake passage 40 is a passage through which a gas to be introduced into the combustion chamber 17 flows. An air cleaner 41 for filtering fresh air is provided at the upstream end of the intake passage 40. A surge tank 42 is provided near the downstream end of the intake passage

40. A part of the intake passage 40 which is located downstream of the surge tank 42 is an independent passage branching to each cylinder 11. The downstream end of the independent passage is connected to the intake port 18 of each cylinder 11.

A throttle valve 43 is provided between the air cleaner 41 and the surge tank 42 in the intake passage 40. The throttle valve 43 is configured to adjust its opening degree to adjust the amount of fresh air to be introduced into the combustion chamber 17.

The supercharger 44 is provided downstream of the throttle valve 43 in the intake passage 40. The supercharger 44 is configured to supercharge a gas in the intake passage 40 which is to be introduced into the combustion chamber 17.

In this configuration example, the supercharger 44 is a mechanical supercharger that is driven by the engine body 2. The mechanical supercharger 44 may be, e.g., a Lysholm supercharger. The mechanical supercharger 44 may have any configuration. The mechanical supercharger 44 may be a roots supercharger, a vane supercharger, or a centrifugal supercharger.

An electromagnetic clutch 45 is provided between the supercharger 44 and the engine body 2. The electromagnetic clutch 45 located between the supercharger 44 and the engine body 2 allows the driving force to be transmitted from the engine body 2 to the supercharger 44 and shuts off the transmission of the driving force. As described later, the supercharger 44 is turned on and off as an ECU 10 switches between engagement and disengagement of the electromagnetic clutch 45. The engine 1 is thus switched between the state in which the supercharger 44 supercharges a gas to be introduced into the combustion chamber 17 and the state in which the supercharger 44 does not supercharge a gas to be introduced into the combustion chamber 17.

An intercooler 46 is provided downstream of the supercharger 44 in the intake passage 40. The intercooler 46 is configured to cool a gas compressed in the supercharger 44. The intercooler 46 is, e.g., a water-cooling intercooler. The intercooler 46 may be an oil-cooling intercooler.

A bypass passage 47 is also connected to the intake passage 40. The bypass passage 47 connects a part of the intake passage 40 which is located upstream of the supercharger 44 and a part of the intake passage 40 which is located downstream of the intercooler 46 so as to bypass the supercharger 44 and the intercooler 46. The bypass passage 47 is provided with an air bypass valve 48. The air bypass valve 48 adjusts the flow rate of the gas flowing in the bypass passage 47.

As shown in FIG. 5, when the supercharger 44 is turned off, that is, when the electromagnetic clutch 45 is disengaged, the air bypass valve 48 is fully opened. The gas flowing in the intake passage 40 thus bypasses the supercharger 44 and flows into the surge tank 42. Namely, the gas flowing in the intake passage 40 flows through the bypass passage 47 into the surge tank 42 without flowing through the supercharger 44 and the intercooler 46 (see solid arrow in FIG. 5). The gas is then introduced into the combustion chamber 17 of the engine body 2. At this time, the engine body 2 operates in a non-supercharging state, namely a naturally aspirated state.

As shown in FIG. 6, when the supercharger 44 is turned on, that is, when the electromagnetic clutch 45 is engaged, the gas flowing in the intake passage 40 flows through the supercharger 44 and the intercooler 46 and then into the surge tank 42 (see solid arrow in FIG. 6). When the air bypass valve 48 is open at this time, a part of the gas having passed through the supercharger 44 flows from the surge tank 42 back to the upstream side of the supercharger 44 through the bypass passage 47 (see dashed arrow in FIG. 6). The amount of gas thus flowing back to the upstream side of the supercharger 44 changes according to the opening degree of the air bypass valve 48. The boost pressure of the gas in the intake passage 40 can be controlled by adjusting the opening degree of the air bypass valve 48.

In this configuration example, a supercharging system 49 is formed in the intake passage 40 by the supercharger 44, the bypass passage 47, and the air bypass valve 48.

The engine body 2 includes a swirl generating portion for generating a swirl flow in the combustion chamber 17. As shown in FIG. 3, the swirl generating portion is a swirl control valve 56 placed in the intake passage 40. Of a primary passage 401 connecting to the first intake port 181 and a secondary passage 402 connecting to the second intake port 182, the swirl control valve 56 is provided in the secondary passage 402.

The swirl control valve 56 is a valve opening control valve that can reduce the cross section of the secondary passage 402. A swirl flow according to the opening degree of the swirl control valve 56 is produced in the combustion chamber 17. The swirl flow swirls counterclockwise in FIG. 3 as shown by arrows (see also white arrows in FIG. 2).

When the opening degree of the swirl control valve 56 is small, the flow rate of the intake air flowing into the combustion chamber 17 through the first intake port 181 out of the first and second intake ports 181, 182 arranged in the front-rear direction of the engine body 2 increases relatively, and the flow rate of the intake air flowing into the combustion chamber 17 through the second intake port 182 decreases relatively. The swirl flow in the combustion chamber 17 becomes stronger. When the opening degree of the swirl control valve 56 is large, the flow rate of the intake air flowing into the combustion chamber 17 through the first intake port 181 and the flow rate of the intake air flowing into the combustion chamber 17 through the second intake port 182 are substantially equal to each other, the swirl flow in the combustion chamber 17 becomes weaker. No swirl flow is produced when the swirl control valve 56 is fully opened.

Instead of placing the swirl control valve 56 in the intake passage 40 or in addition to placing the swirl control valve 56 in the intake passage 40, the swirl generating portion may be configured by shifting the open periods of the two intake valves 21 from each other so that intake air can be introduced into the combustion chamber 17 only through one of the intake valves 21. Since only one of the two intake valves 21 is opened, intake air is unevenly introduced into the combustion chamber 17, whereby a swirl flow can be produced in the combustion chamber 17. The swirl generating portion may be configured by changing the shape of the intake port 18 as appropriate so that a swirl flow is produced in the combustion chamber 17.

An exhaust passage 50 is connected to another side surface of the engine body 2. The exhaust passage 50 communicates with the exhaust port 19 for each cylinder 11 and communicates with the combustion chamber 17 through the exhaust port 19. The exhaust passage 50 is a passage through which an exhaust gas discharged from the combustion chamber 17 flows. Although not shown in detail in the figures, an upstream part of the exhaust passage 50 is an independent passage branching to each cylinder 11. The upstream end of the independent passage is connected to the exhaust port 19 for each cylinder 11.

The exhaust passage 50 is provided with an exhaust gas control system having a plurality of (in the example of FIG. 1, two) catalytic converters. Although not shown in the figures, the upstream catalytic converter is disposed in an engine compartment. The upstream catalytic converter includes a three-way catalyst 511 and a gasoline particulate filter (GPF) 512. The downstream catalytic converter is disposed outside the engine compartment. The downstream catalytic converter includes a three-way catalyst 513.

The exhaust gas control system is not limited to the illustrated configuration. For example, the GPF 512 may be omitted. The catalytic converters are not limited to the three-way catalysts 511, 513. The order of the three-way catalysts 511, 513 and the GPF 512 may be changed as appropriate.

An EGR passage 52 of an external EGR system 55A is provided between the intake passage 40 and the exhaust passage 50. The EGR passage 52 is a passage for recirculating a part of burned gas to the intake passage 40 and connects the intake passage 40 and the exhaust passage 50. The upstream end of the EGR passage 52 is connected to a part of the exhaust passage 50 which is located between the upstream catalytic converter and the downstream catalytic converter. The downstream end of the EGR passage 52 is connected to a part of the intake passage 40 which is located upstream of the supercharger 44.

The EGR passage 52 is provided with a water-cooling EGR cooler 53. The EGR cooler 53 is configured to cool a burned gas. The EGR passage 52 is further provided with an EGR valve 54. The EGR valve 54 is configured to adjust the flow rate of the burned gas flowing in the EGR passage 52. The amount of recirculation of the cooled burned gas, i.e., an external EGR gas, can be adjusted by changing the opening degree of the EGR valve 54.

In this configuration example, an EGR system 55 is formed by the external EGR system 55A including the EGR passage 52 and the EGR valve 54 and an internal EGR system 55B including the intake electric S-VT 23 and the exhaust electric S-VT 24.

The compression self-ignition type engine 1 includes the engine control unit (ECU) 10 for operating the engine body 2. The ECU 10 is a controller based on a well-known microcomputer. As shown in FIG. 4, the ECU 10 includes a central processing unit (CPU) 101 for executing a program, memory 102 formed by, e.g., a random access memory (RAM) and a read only memory (ROM) and storing the program and data, and an input/output bus 103 for inputting and outputting electrical signals. The ECU 10 is an example of the control unit.

The ECU 10 is connected to the injector 6, the spark plug 25, the intake electric S-VT 23, the exhaust electric S-VT 24, the fuel supply system 61, the throttle valve 43, the EGR valve 54, the electromagnetic clutch 45 for the supercharger 44, the air bypass valve 48, and the swirl control valve 56. As shown in FIGS. 1 to 4, various sensors SW1 to SW16 are connected to the ECU 10. The sensors SW1 to SW16 output detection signals to the ECU 10.

These sensors include: an airflow sensor SW1 and a first intake temperature sensor SW2 which are disposed downstream of the air cleaner 41 in the intake passage 40; a first pressure sensor SW3 disposed downstream of the connection position of the EGR passage 52 and upstream of the supercharger 44 in the intake passage 40; a second intake temperature sensor SW4 disposed downstream of the supercharger 44 and upstream of the connection position of the bypass passage 47 in the intake passage 40; a second pressure sensor SW5 mounted on the surge tank 42; a pressure sensor SW6 for each cylinder 11 which is mounted on the cylinder head 13; and an exhaust temperature sensor SW7 disposed in the exhaust passage 50.

The airflow sensor SW1 detects the flow rate of fresh air flowing in the intake passage 40. The first intake temperature sensor SW2 detects the temperature of the fresh air flowing in the intake passage 40. The first pressure sensor SW3 detects the pressure of the gas flowing into the supercharger 44. The second intake temperature sensor SW4 detects the temperature of the gas having flowed out of the supercharger 44. The second pressure sensor SW5 detects the pressure of the gas flowing downstream of the supercharger 44. The pressure sensor SW6 detects the pressure in each combustion chamber 17. The exhaust gas temperature sensor SW7 detects the temperature of the exhaust gas discharged from the combustion chamber 17.

The sensors further include: a linear $O_2$ sensor SW8 disposed upstream of the upstream catalytic converter in the exhaust passage 50; a lambda $O_2$ sensor SW9 disposed downstream of the three-way catalyst 511 of the upstream converter; a water temperature sensor SW10, a crank angle sensor SW11, an intake cam angle sensor SW12, and an exhaust cam angle sensor SW13 which are mounted on the engine body 2; an accelerator operation amount sensor SW14 mounted on an accelerator pedal mechanism; an EGR differential pressure sensor SW15 disposed in the EGR passage 52; and a fuel pressure sensor SW16 mounted on the common rail 64 of the fuel supply system 61.

The linear $O_2$ sensor SW8 and the lambda $O_2$ sensor SW9 detect the oxygen concentration in the exhaust gas. The water temperature sensor SW10 detects the temperature of cooling water. The crank angle sensor SW11 detects the rotation angle of the crankshaft 15. The intake cam angle sensor SW12 detects the rotation angle of the intake camshaft. The exhaust cam angle sensor SW13 detects the rotation angle of the exhaust camshaft. The accelerator operation amount sensor SW14 detects the amount of accelerator operation. The EGR differential pressure sensor SW15 detects the differential pressure between the upstream and downstream sides of the EGR valve 54. The fuel pressure sensor SW16 detects the pressure of fuel to be supplied to the injector 6.

The ECU 10 calculates determines the operating state of the engine body 2 and calculates controlled variables for each device, based on the detection signals of these sensors. The ECU 10 outputs control signals according to the calculated controlled variables to the injector 6, the spark plug 25, the intake electric S-VT 23, the exhaust electric S-VT 24, the fuel supply system 61, the throttle valve 43, the EGR valve 54, the electromagnetic clutch 45 for the supercharger 44, the air bypass valve 48, and the swirl control valve 56.

For example, the ECU 10 sets target torque for the engine body 2 and determines a target boost pressure, based on the detection signal of the accelerator operation amount sensor SW12 and a preset map. The ECU 10 performs feedback control so that the boost pressure becomes equal to the target boost pressure. The ECU 10 performs this feedback control by adjusting the opening degree of the air bypass valve 48 based on the target boost pressure and the differential pressure before and after the supercharger 44 which is obtained from the detection signals of the first pressure sensor SW3 and the second pressure sensor SW5.

The ECU 10 also sets a target EGR ratio, namely the ratio of the EGR gas to the total amount of gas in the combustion chamber 17, based on the operating state of the engine body 2 and a preset map. The ECU 10 determines a target amount of EGR gas based on the target EGR ratio and the amount of intake air that is based on the detection signal of the accelerator operation amount sensor SW12. The ECU 10 performs feedback control so that the amount of external EGR gas introduced into the combustion chamber 17 becomes equal to the target amount of EGR gas. The ECU 10 performs this feedback control by adjusting the opening degree of the EGR valve 54 based on the differential pressure before and after the EGR valve 54 which is obtained from the detection signal of the EGR differential pressure sensor SW15. How the ECU 10 controls the engine 1 will be described in detail later.

<Operation Region of Engine>

Figure 7:
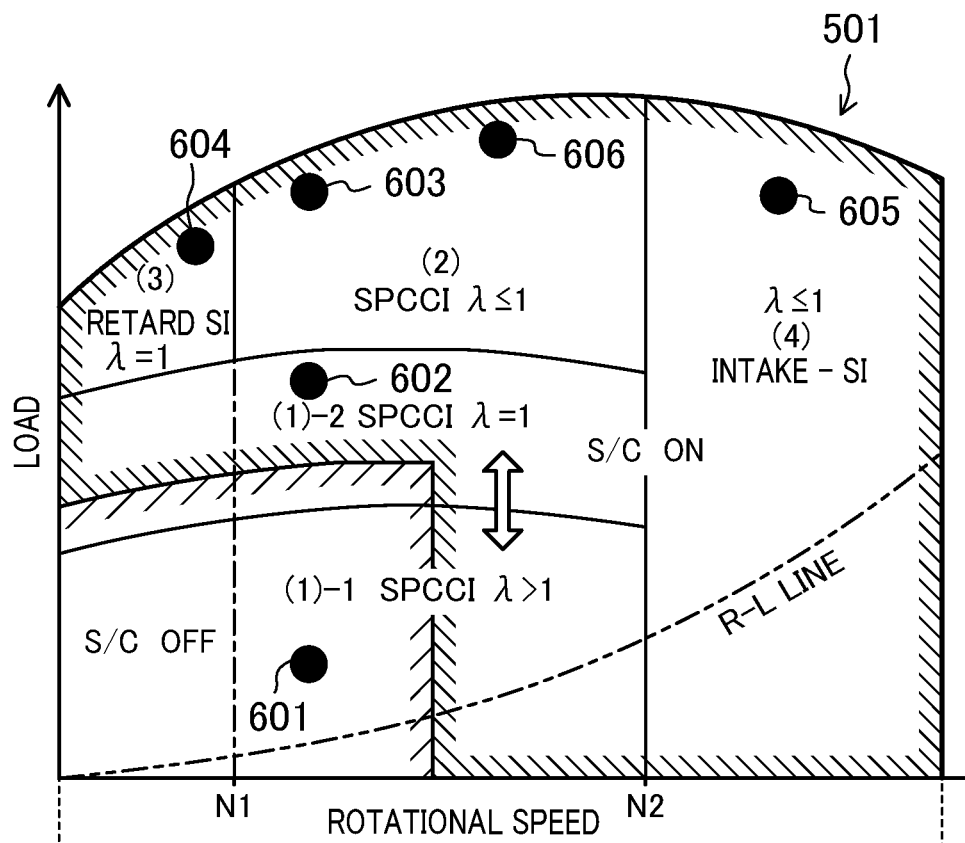
FIG. 7 illustrates an operation region map of the engine.
Figure 7:
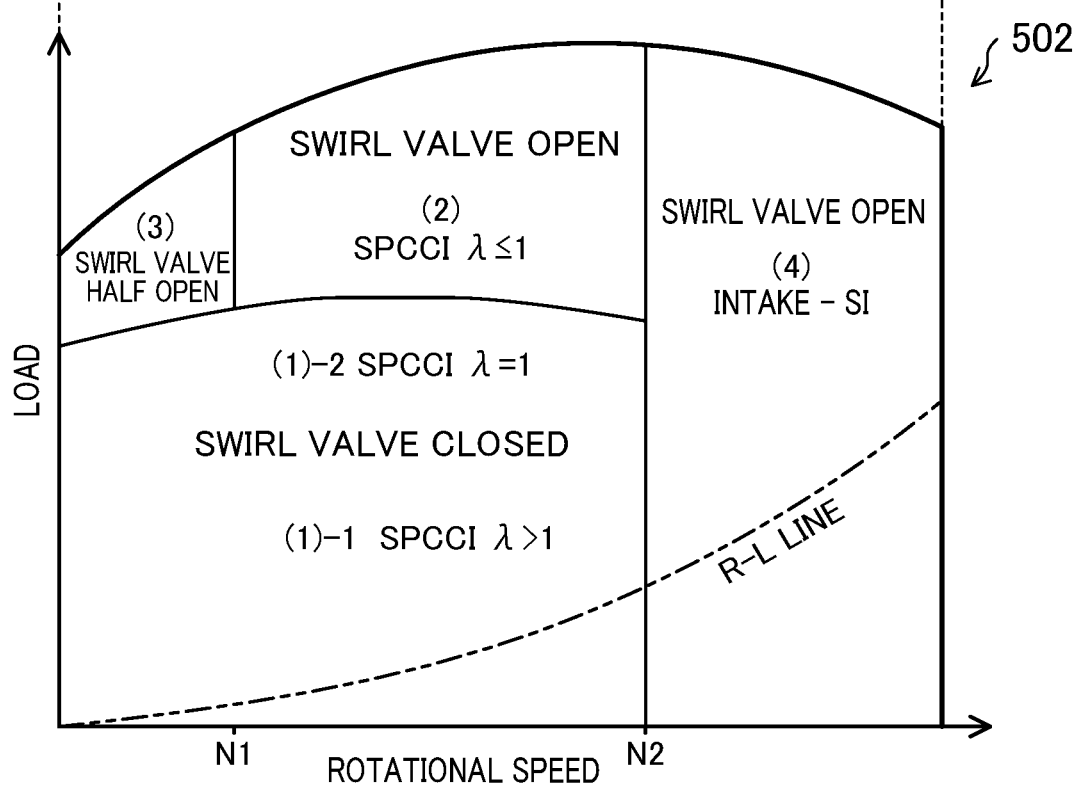

FIG. 7 illustrates operation region maps 501, 502 for the engine 1. The operation region maps 501, 502 for the engine 1 are determined by the load and the rotational speed of the engine body 2. Each operation region map 501, 502 is divided into five regions according to the load and the rotational speed of the engine body 2.

Specifically, the five regions are a low load region (1)-1 that is a low to medium rotational speed region including idle operation, a medium load region (1)-2 that is a low to medium rotational speed region where the load is higher than the low load region (1)-1, a high load, medium rotational speed region (2) where the load is higher than the medium load region (1)-2 and which includes a full open load, a high load, low rotational speed region (3) where the rotational speed is lower than the medium rotational speed region (2), and a high rotational speed region (4) where the rotational speed is higher than the low load region (1)-1, the medium load region (1)-2, the high load, medium rotational speed region (2), and the high load, low rotational speed region (3).

The low rotational speed region, the medium rotational speed region, and the high rotational speed region are the regions obtained by dividing the entire operation region of the engine 1 into three substantially equal regions in the rotational speed direction. In the example of FIG. 7, the low rotational speeds are the rotational speeds lower than a rotational speed N1, the high rotational speeds are the rotational speeds equal to or higher than a rotational speed N2, and the medium rotational speeds are the rotational speeds equal to or higher than the rotational speed N1 and less than the rotational speed N2. The rotational speed N1 may be, e.g., about 1,200 rpm, and the rotational speed N2 may be, e.g., about 4,000 rpm.

The high load, medium rotational speed region (2) may be a region where the fuel pressure is equal to or higher than 900 kPa. For ease of understanding, the two operation region maps 501, 502 for the engine 1 are shown separately in FIG. 7. The map 501 shows the state of the air-fuel mixture in each region, the combustion mode in each region, the region where the supercharger 44 is driven, and the region where the supercharger 44 is not driven. The map 502 shows the opening degree of the swirl control valve 56 in each region. The long dashed double-short dashed line in FIG. 7 indicates a road-load line for the engine 1.

The engine 1 performs combustion by compression self-ignition in the low load region (1)-1, the medium load region (1)-2, and the high load, medium rotational speed region (2) mainly in order to improve fuel efficiency and exhaust performance. The engine 1 performs combustion by spark ignition in the other regions, specifically in the high load, low rotational speed range (3) and the high rotational speed region (4). Operation of the engine 1 in each region will be described in detail below with reference to the fuel injection timings and the ignition timing shown in FIG. 8, the opening timing of the intake valve 21 shown in FIG. 9, the closing timing of the exhaust valve 22 shown in FIG. 10, and the EGR ratio of external EGR shown in FIG. 12.

<Low Load Region (1)-1>

When the engine body 2 operates in the low load region (1)-1, the engine 1 performs CI combustion as described above. In combustion by self-ignition, the timing of self-ignition changes significantly if the temperature in the compression chamber 17 before the start of compression varies. Accordingly, the engine 1 performs SPCCI combustion, which is a combination of SI combustion and CI combustion, in the low load region (1)-1. In the low load region (1)-1, the engine 1 controls the specifications (the closing timing of the intake valve 21 and the boost pressure) so that the effective compression ratio of the engine body 2 is 12:1 or more with a difference from the geometric compression ratio of the engine body 2 being within 2.

Figure 8:
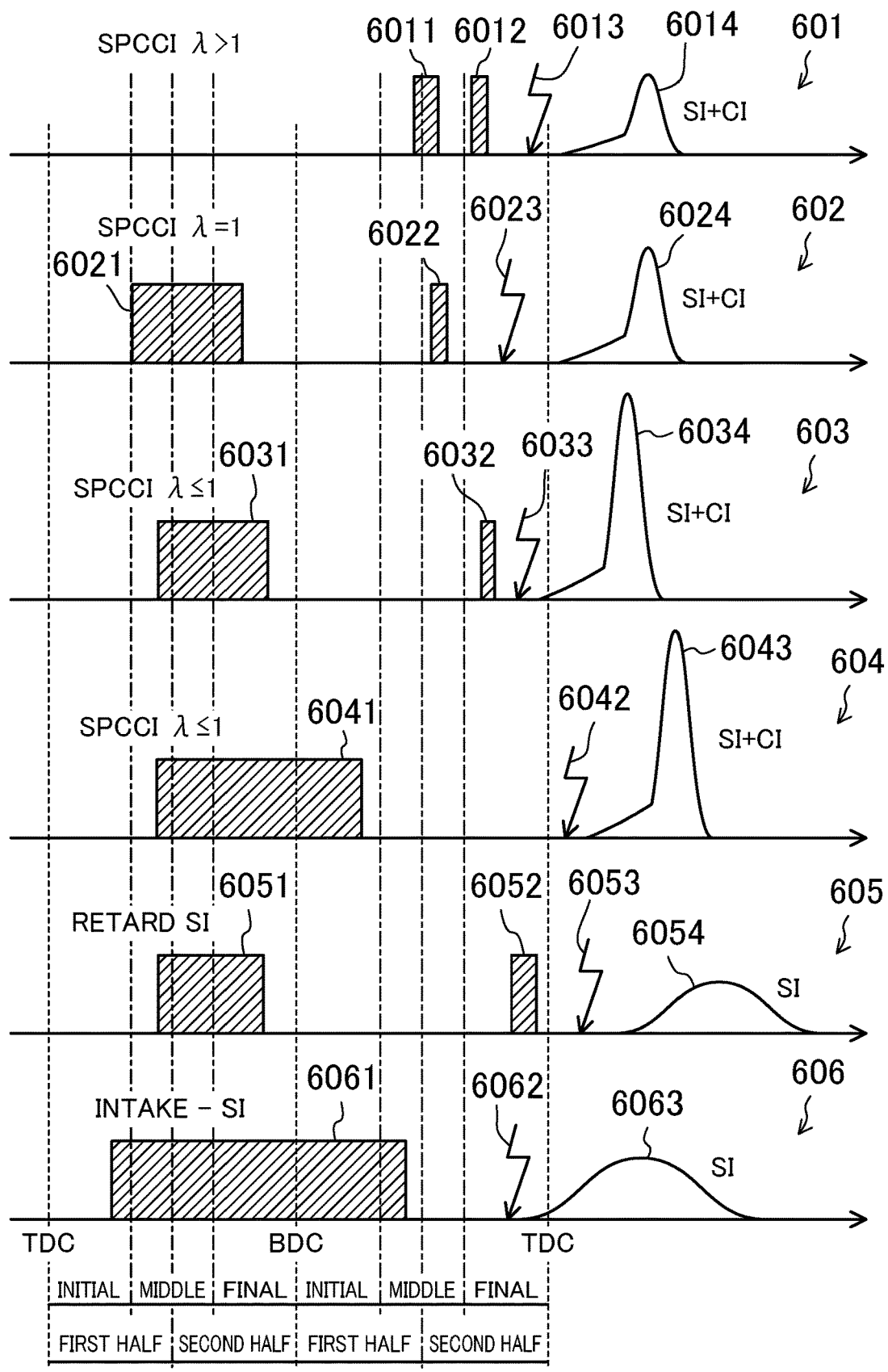
FIG. 8 illustrates fuel injection times, ignition timings, and combustion waveforms in each operation region.

Reference character 601 in FIG. 8 indicates an example of the fuel injection timings (reference characters 6011, 6012), the ignition timing (reference character 6013), and the combustion waveform (i.e., the waveform indicating a change in a heat release rate with respect to the crank angle, reference character 6014) when the engine body 2 operates in an operating state 601 in the low load region (1)-1.

In the SPCCI combustion, the spark plug 25 forcibly ignites the air-fuel mixture in the combustion chamber 17 to cause SI combustion of the air-fuel mixture by flame propagation. The temperature in the combustion chamber 17 increases due to heat generation of the SI combustion and the pressure in the combustion chamber 17 also increases due to the flame propagation, thereby causing CI combustion of the unburned air-fuel mixture by self-ignition.

Variation in temperature in the compression chamber 17 before the start of compression can be absorbed by adjusting the amount of heat that is generated by the SI combustion. Even if the temperature in the combustion chamber 17 before the start of compression varies, the timing of self-ignition can be controlled by adjusting the start timing of the SI combustion by adjusting, e.g., the ignition timing.

When performing SPCCI combustion, the spark plug 25 ignites the air-fuel mixture at a predetermined timing near the compression top dead center (the top dead center (TDC) on the right side of FIG. 8). Combustion by flame propagation is thus started. Heat generation during SI combustion is slower than that during CI combustion. Accordingly, the slope of the rise of the waveform of the heat release rate is relatively shallow. Although not shown in the figure, pressure fluctuations (dp/de) in the combustion chamber 17 are also lower during SI combustion than during CI combustion.

As the temperature and pressure in the combustion chamber 17 are increased by SI combustion, the unburned air-fuel mixture is self-ignited. In the example of FIG. 8, the slope of the waveform of the heat release rate becomes steeper (reference character 6014) at the timing of self-ignition. That is, the waveform of the heat release rate has an inflection point at the timing CI combustion is started.

After CI combustion is started, SI combustion and CI combustion are performed in parallel. The heat release rate of CI combustion is larger than that of SI combustion because CI combustion generates a larger amount of heat than SI combustion does. However, since CI combustion is performed after the compression top dead center, the piston 3 has been lowered by motoring at the start of CI combustion. This avoids the slope of the waveform of the heat release rate from becoming too steep by CI combustion. Pressure fluctuations (dp/de) during CI combustion also become relatively low.

The pressure fluctuations (dp/de) can be used as an index of combustion noise. Since the pressure fluctuations (dp/de) can be reduced in SPCCI combustion as described above, the use of SPCCI combustion can avoid combustion noise from becoming too loud. Combustion noise is thus reduced to an acceptable level or lower.

SPCCI combustion is finished when CI combustion is finished. The combustion period of CI combustion is shorter than that of SI combustion. Accordingly, the timing the SPCCI combustion is finished is earlier than in the case where combustion is performed using only SI combustion or using mainly SI combustion. In other words, the timing the SPCCI combustion is finished during the expansion stroke can be set closer to the compression top dead center. Accordingly, SPCCI combustion is advantageous in improving fuel efficiency performance of the engine 1 as compared to the case where combustion is performed using only SI combustion or using mainly SI combustion.

When the engine body 2 operates in the low load region (1)-1, the EGR system 55 introduces the EGR gas into the combustion chamber 17 in order to improve the fuel efficiency of the engine 1.

Specifically, a positive overlap period during which both the intake valve 21 and the exhaust valve 22 are open is provided near the exhaust top dead center, so that internal EGR is performed during the positive overlap period. In the internal EGR, a part of the exhaust gas discharged from the combustion chamber 17 into the intake port 18 and the exhaust port 19 is introduced back into the combustion chamber 17. Performing the internal EGR is advantageous in stabilizing SPCCI combustion as hot burned gas (internal EGR gas) is introduced into the combustion chamber 17 and the temperature in the combustion chamber 17 is increased.

Figure 9:
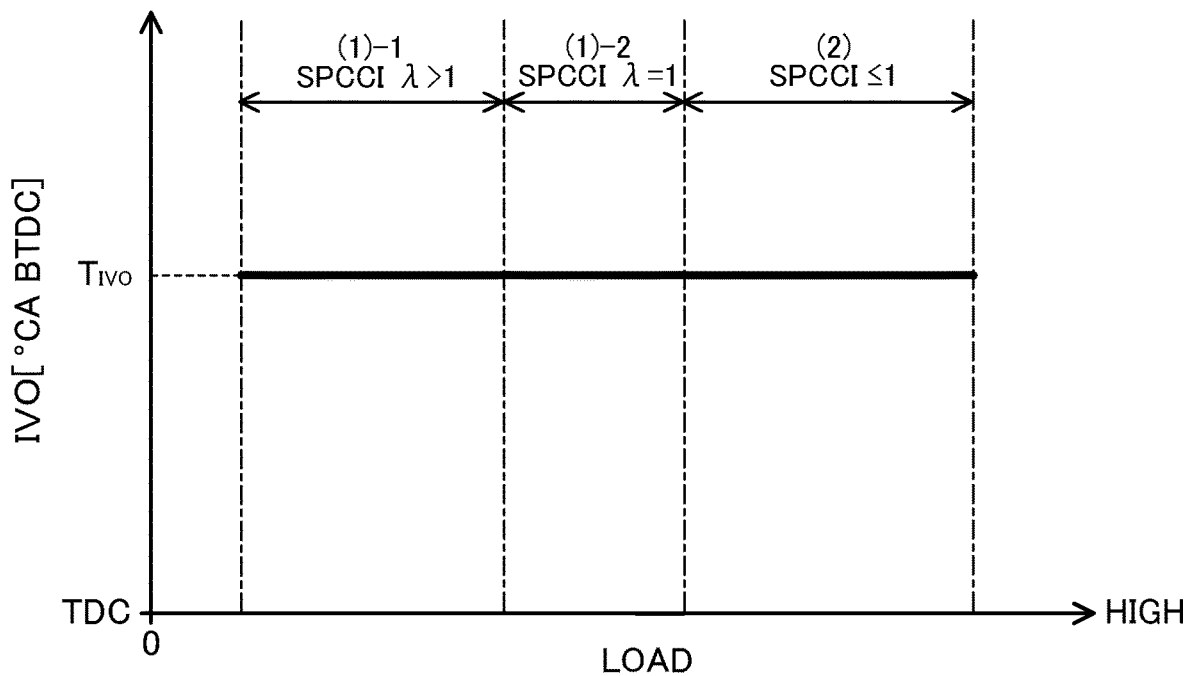
FIG. 9 is a graph illustrating the opening timing of an intake valve in an operation region for SPCCI combustion.

An opening timing $T_{IVO}$ of the intake valve 21 is set to a fixed or substantially fixed timing within the crank angle range of $\pm 5°$ in the entire region in the load direction and the entire region in the rotational speed direction in the low load region (1)-1. As shown in FIG. 9, the opening timing $T_{IVO}$ of the intake valve 21 is preferably fixed to a certain timing. For example, the opening timing $T_{IVO}$ of the intake valve 21 is 30° C.A before the compression top dead center. A closing timing of the intake valve 21 is thus also fixed to a certain timing, namely a certain crank angle ($T_{IVC}$ in FIG. 11), in the entire region in the load direction and the entire region in the rotational speed direction in the low load region (1)-1.

Figure 10:
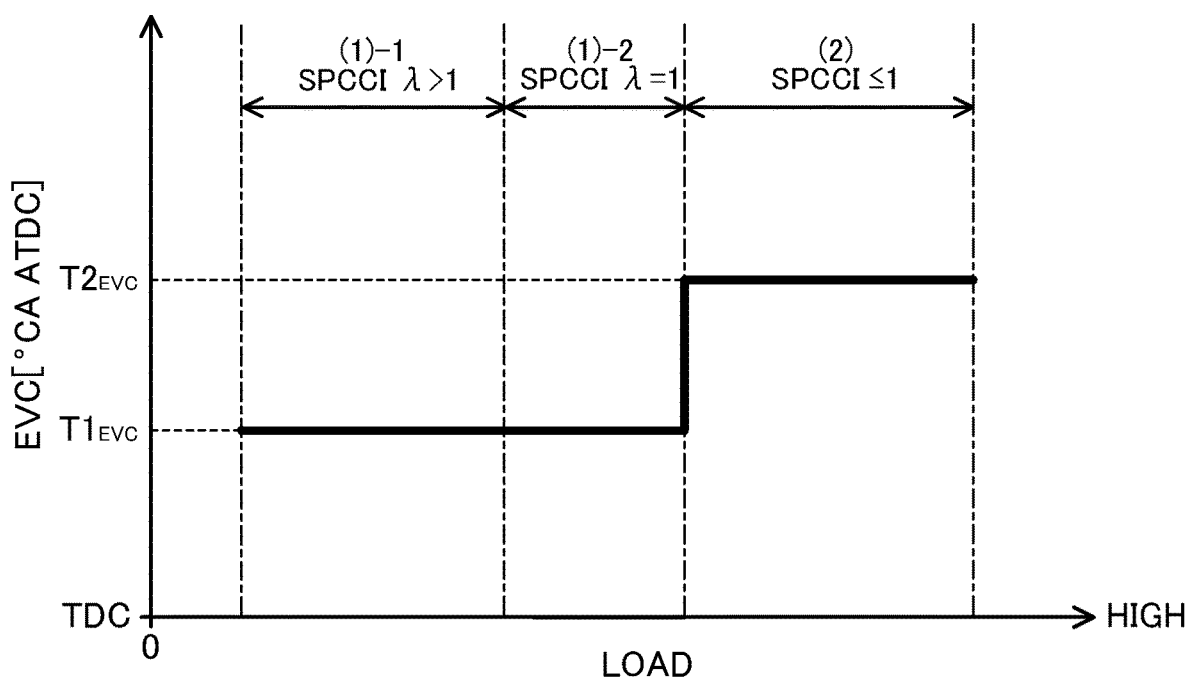
FIG. 10 is a graph illustrating the closing timing of an exhaust valve in the operation region for SPCCI combustion.

A closing timing $T1_{EVC}$ of the exhaust valve 22 is set to a fixed or substantially fixed timing within the crank angle range of $\pm 5°$ in the entire region in the load direction and the entire region in the rotational speed direction in the low load region (1)-1. As shown in FIG. 10, the closing timing $T1_{EVC}$ of the exhaust valve 22 is preferably fixed to a certain timing. For example, the closing timing $T1_{EVC}$ of the exhaust valve 22 is 16.5° C.A after the compression top dead center. An opening timing of the exhaust valve 22 is thus also fixed to a certain timing, namely a certain crank angle ($T1_{EVO}$ in FIG. 11), in the entire region in the load direction and the entire region in the rotational speed direction in the low load region (1)-1.

Figure 11:
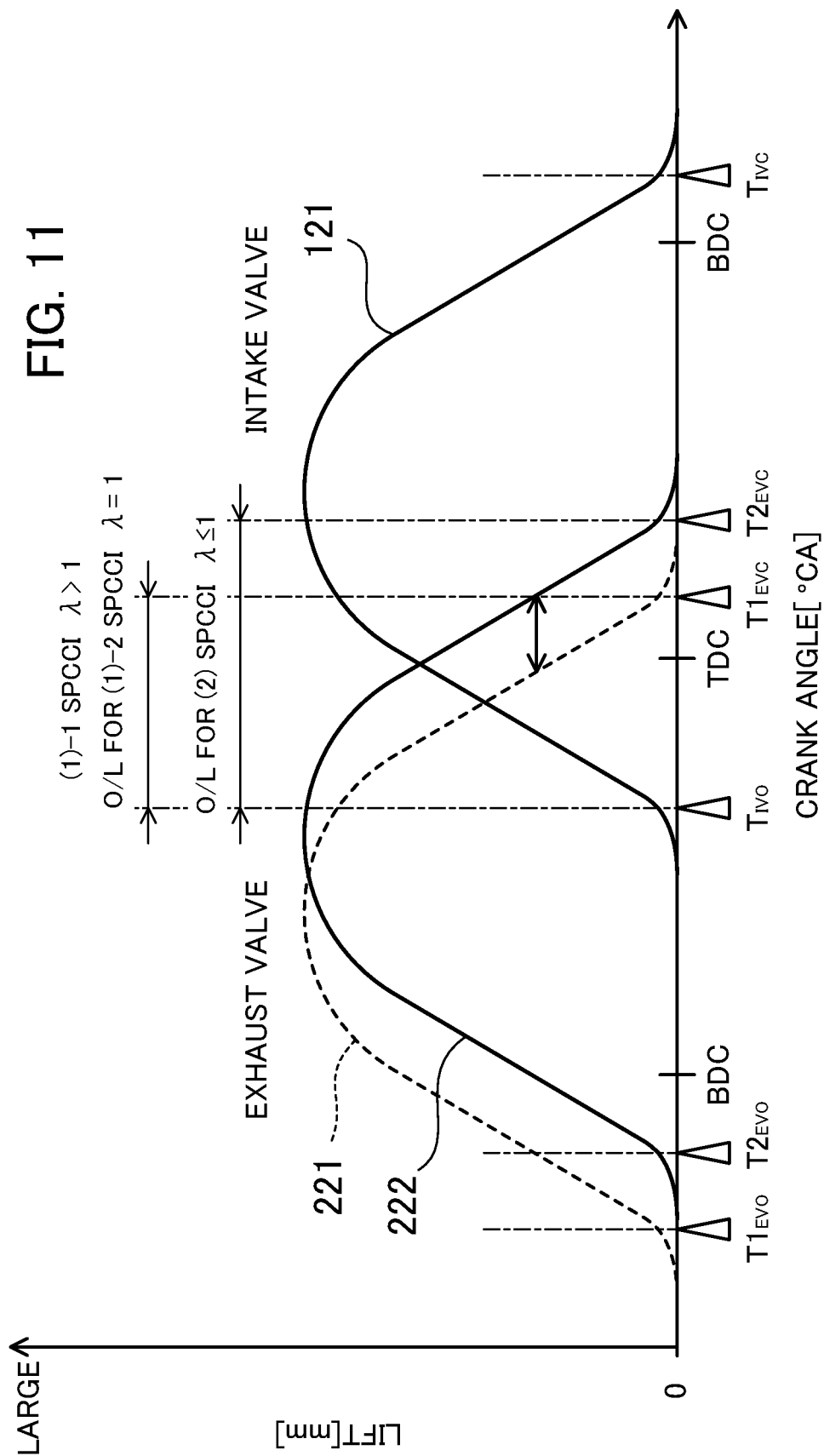
FIG. 11 is a graph illustrating the opening and closing timings of the intake and exhaust valves and a positive overlap period in the operation region for SPCCI combustion.

The opening timing $T_{IVO}$ and the closing timing $T_{IVC}$ of the intake valve 21 and the opening timing $T1_{EVO}$ and the closing timing $T1_{EVC}$ of the exhaust valve 22 are thus set so that the positive overlap period is equal to or longer than a predetermined crank angle range, as shown by a valve lift curve 121 of the intake valve 21 shown by solid line in FIG. 11 and a valve lift curve 221 of the exhaust valve 22 shown by dashed line in FIG. 11. For example, the positive overlap period need only be set to a crank angle of 40° or more. In the above example of the opening timing $T_{IVO}$ of the intake valve 21 and the closing timing $T1_{EVC}$ of the exhaust valve 22, the positive overlap period is a period of 46.5° C.A including the compression top dead center.

When the closing timing $T_{IVC}$ of the intake valve 21 is set according to this overlap period, the effective compression ratio of the engine body 2 can be set to 12:1 or more with a difference from the geometric compression ratio of the engine body 2 being within 2 in the low load region (1)-1.

Although not precisely shown in the figures, the opening timings $T_{IVO}$, $T1_{EVO}$ and the closing timings $T_{IVC}$, $T1_{EVC}$ of the intake valve 21 and the exhaust valve 22 are defined as the timings the lift sharply rises or falls in the valve lift curves 121, 221 of each valve, and are defined as, e.g., the timings the lift is 0.3 mm. The same applies to the following description.

Figure 12:
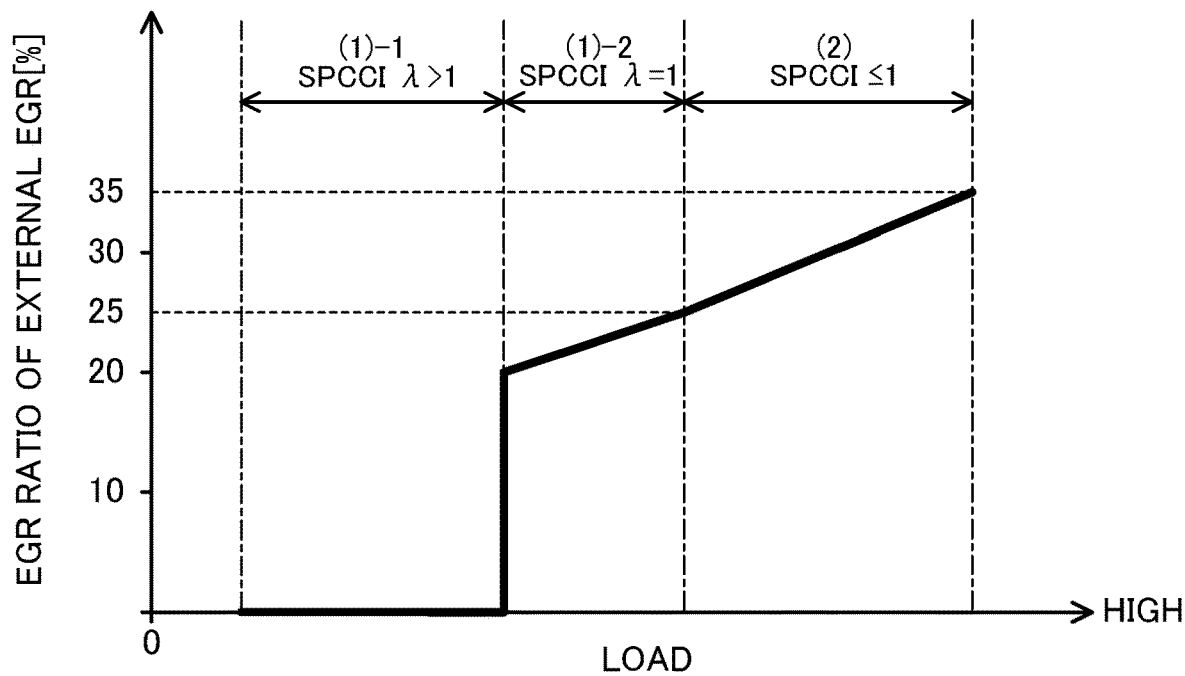
FIG. 12 is a graph illustrating an EGR ratio of external EGR in the operation region for SPCCI combustion.

In the low load region (1)-1, the EGR valve 54 is fully closed, and as shown in FIG. 12, no external EGR gas is introduced into the combustion chamber 17.

The supercharger 44 is turned off when the engine body 2 operates in a part of the low load region (1)-1. Specifically, the supercharger 44 is turned off in a low rotational speed region of the low load region (1)-1 (see S/C OFF). In a high rotational speed region of the low load region (1)-1, the supercharger 44 is turned on to increase the boost pressure in order to ensure a required intake charge as the rotational speed of the engine body 2 increases (see S/C ON).

When the supercharger 44 is off and the gas in the intake passage 40 is not supercharged, the pressure in the intake passage 40 is relatively low. Accordingly, an internal EGR gas (hot burned gas) is introduced into the combustion chamber 17 during the positive overlap period as described above. The temperature in the combustion chamber 17 thus increases, which is advantageous in stabilizing SPCCI combustion in the low rotational speed region of the low load region (1)-1.

When the supercharger 44 is on and the gas in the intake passage 40 is supercharged, the pressure in the intake passage 40 is relatively high. Accordingly, the gas in the intake passage 40 flows through the combustion chamber 17 of the engine body 2 into the exhaust passage 50 during the positive overlap period. The burned gas remaining in the combustion chamber 17 is thus caused to flow out of the combustion chamber 17 into the exhaust passage 50 and is scavenged. As the gas remaining in the combustion chamber 17 is scavenged, the temperature in the combustion chamber 17 decreases. Accordingly, the effective compression ratio can be increased and the expansion work can be increased, which is advantageous in obtaining higher torque in the high rotational speed region of the low load region (1)-1.

As described above, the internal EGR is performed in the low rotational speed range of the low load region (1)-1 and the scavenging is performed in the high rotational speed rage of the low load region (1)-1 by turning on and off the supercharger 44, namely by switching whether the gas in the intake passage 40 is supercharged or not. With this configuration, even when the rotational speed of the engine body 2 changes suddenly, switching between the internal EGR and the scavenging is responsively performed, so that a sufficient effective compression ratio can be obtained and torque can be increased. Both improved fuel efficiency and increased torque can be achieved when the rotational speed of the engine body 2 changes suddenly in the low load region (1)-1.

When the engine body 2 operates in the low load region (1)-1, the swirl control valve 56 is fully closed or at a predetermined angle on the valve closing side. A strong swirl flow is thus produced in the combustion chamber 17. The swirl flow is strong in the outer peripheral portion of the combustion chamber 17 and is weak in the central portion thereof. As described above, the intake port 18 is a tumble port. Accordingly, an oblique swirl flow having a tumble component and a swirl component is produced in the combustion chamber 17.

When the engine body 2 operates in the low load region (1)-1, the swirl ratio is 4 or more. The "swirl ratio" is the integrated value of the intake flow lateral angular velocity measured at each valve lift divided by the engine angular velocity. The intake flow lateral angular velocity can be obtained based on the measurement using a rig test device shown in FIG. 14.

Figure 14:
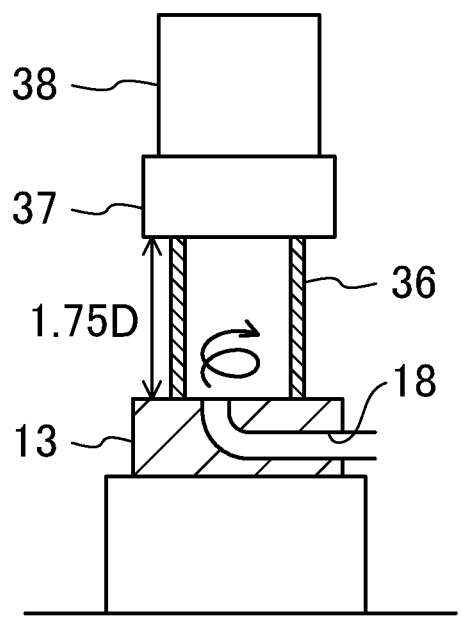
FIG. 14 illustrates a rig test device for measuring the swirl ratio.

The device shown in FIG. 14 is configured as follows. The cylinder head 13 is placed upside down on a base with the intake port 18 connected to an intake supply device located outside of the figure, a cylinder 36 is placed on the cylinder head 13, and an impulse meter 38 having a honeycomb rotor 37 is connected to the upper end of the cylinder 36. The lower surface of the impulse meter 38 is positioned 1.75D away from the mating surfaces of the cylinder head 13 and the cylinder block, where "D" represents the cylinder bore diameter. This device uses the impulse meter 38 to measure the torque acting on the honeycomb rotor 37 due to the swirl flow (see arrow in FIG. 14) produced in the cylinder 36 as intake air is supplied. The intake flow lateral angular velocity can be obtained based on the measured torque.

Figure 15:
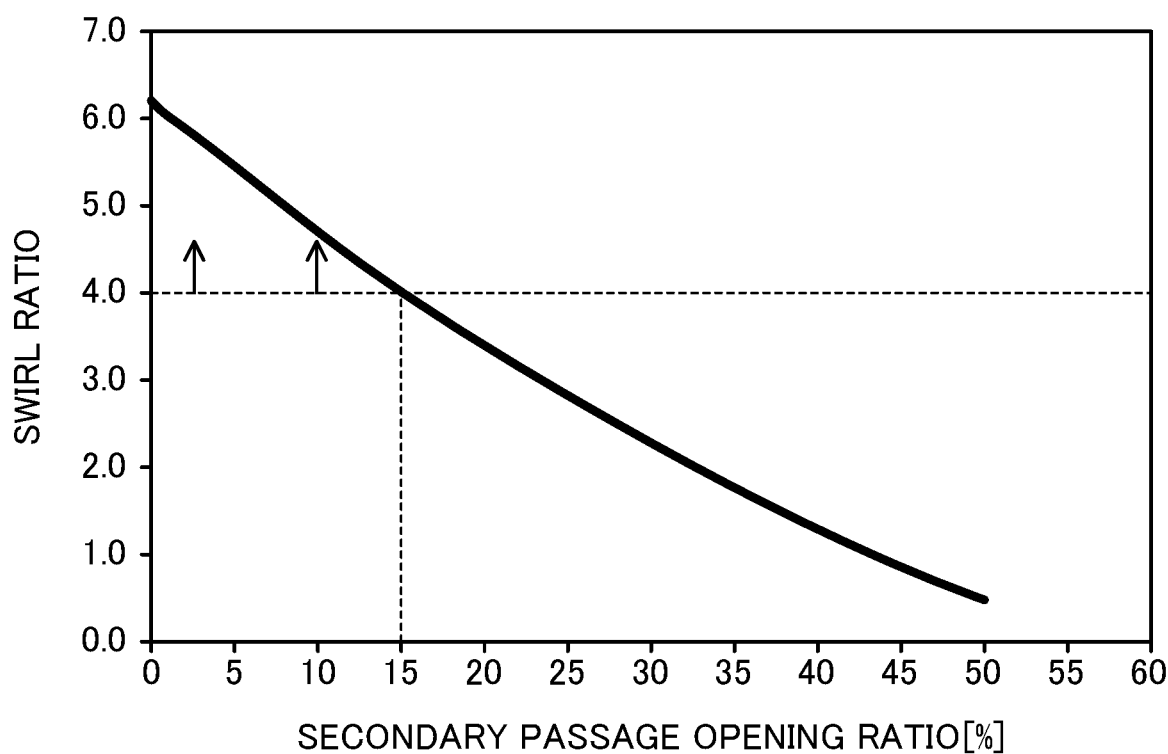
FIG. 15 illustrates the relationship between the opening ratio of a secondary passage and the swirl ratio.

FIG. 15 shows the relationship between the opening degree of the swirl control valve 56 and the swirl ratio in the engine 1. In FIG. 15, the opening degree of the swirl control valve 56 is represented by the opening ratio to the fully open cross section of the secondary passage 402. When the swirl control valve 56 is fully closed, the opening ratio of the secondary passage 402 is 0%. As the opening degree of the swirl control valve 56 increases, the opening ratio of the secondary passage 402 becomes larger than 0%. When the swirl control valve 56 is fully opened, the opening ratio of the secondary passage 402 is 100%.

As illustrated in FIG. 15, when the swirl control valve 56 is fully closed in the engine 1, the swirl ratio is about 6. When the engine 1 operates in the low load region (1)-1, the swirl ratio is 4 or more and 6 or less. The opening degree of the swirl control valve 56 is adjusted in such a range that the opening ratio becomes equal to higher than 0% and 15% or less.

When the engine body 2 operates in the low load region (1)-1, an overall air-fuel ratio (A/F) of the air-fuel mixture in the combustion chamber 17 is leaner than the stoichiometric air-fuel ratio. That is, the overall excess air ratio $\lambda$ of the air-fuel mixture in the combustion chamber 17 is higher than 1. More specifically, the overall A/F of the air-fuel mixture in the combustion chamber 17 is 30 or more. This reduces generation of raw $NO_x$ and improves emission performance.

When the engine body 2 operates in the low load region (1)-1, the air-fuel mixture is stratified in the central portion and the outer peripheral portion of the combustion chamber 17. The central portion of the combustion chamber 17 is a portion where the spark plug 25 is disposed. The outer peripheral portion of the combustion chamber 17 is a portion surrounding the central portion and contacting the liner of the cylinder 11. The central portion of the combustion chamber 17 may be defined as a portion where a swirl flow is weak, and the outer peripheral portion of the combustion chamber 17 may be defined as a portion where a swirl flow is strong.

Fuel concentration of the air-fuel mixture is greater in the central portion of the combustion chamber 17 than in the outer peripheral portion of the combustion chamber 17. Specifically, the A/F of the air-fuel mixture is 20 or more and 30 or less in the central portion of the combustion chamber 17 and is 35 or more in the outer peripheral portion of the combustion chamber 17. The value of the air-fuel ratio is the value of the air-fuel ratio at the time of ignition. The same applies to the following description.

When the engine body 2 operates in the low load region (1)-1, the injector 6 injects fuel into the combustion chamber 17 a plurality of times during the compression stroke (reference characters 6011, 6012). Specifically, fuel is injected in the middle stage of the compression stroke and the final stage of the compression stroke. The middle and final stages of the compression stroke are the middle and final stages of the compression stroke divided into three equal parts, namely the initial, middle, and final stages, according to the crank shaft.

Fuel injected in the middle stage of the compression stroke spreads in the combustion chamber 17 until the ignition timing and forms the air-fuel mixture in the central portion and the outer peripheral portion of the combustion chamber 17. Fuel injected in the final stage of the compression stroke does not spread so much as there is only a short time until ignition. This fuel is transported to a position near the spark plug 25 in the central portion of the combustion chamber 17 by a swirl flow and forms, together with a part of fuel injected in the middle stage of the compression stroke, the air-fuel mixture in the central portion of the combustion chamber 17. As described above, the air-fuel mixture is thus stratified in the central portion and the outer peripheral portion of the combustion chamber 17.

The spark plug 25 ignites the air-fuel mixture in the central portion of the combustion chamber 17 at a predetermined timing before the compression top dead center after the fuel injection is finished (reference character 6013). Since the fuel concentration of the air-fuel mixture is relatively high in the central portion of the combustion chamber 17, ignitability is improved and SI combustion by flame propagation is stabilized. Since SI combustion is stabilized, CI combustion starts at an appropriate timing. That is, controllability of CI combustion is improved in SPCCI combustion. As a result, both reduced combustion noise and improved fuel efficiency due to the reduced combustion period are achieved when the engine body 2 operates in the low load region (1)-1.

The injection timings and the number of fuel injections when the engine body 2 operates in the low load region (1)-1 are changed according to the load of the engine 1.

Specifically, when the load of the engine body 2 is low, the number of fuel injections during the compression stroke is increased, and the timing of completion of fuel injection is retarded. That is, when the load of the engine body 2 is low, the number of times fuel injection is performed during the compression stroke is increased, and the timing of the last fuel injection is retarded. This reduces the amount of fuel that is supplied to the combustion chamber 17 but also reduces spreading of the fuel injected during the compression stroke when the load of the engine body 2 is low. As a result, a smaller air-fuel mixture layer with a relatively high fuel concentration is formed in the central portion of the combustion chamber 17.

When the load of the engine body 2 is high, the number of fuel injections during the compression stroke is reduced, and the fuel injection timings are advanced. As a result of advancing the fuel injection timings, fuel injection may not be performed during the compression stroke and instead may be performed a plurality of times during the intake stroke. When the load of the engine body 2 is high, fuel injection may be performed at a time during the compression stroke. This increases the amount of fuel that is supplied to the combustion chamber 17 and facilitates spreading of the fuel when the load of the engine body 2 is high. As a result, a larger air-fuel mixture layer with a relatively high fuel concentration is formed in the central portion of the combustion chamber 17.

As described above, in the low load region (1)-1, the engine 1 performs SPCCI combustion using an air-fuel mixture leaner than the stoichiometric air-fuel ratio. The low load region (1)-1 can therefore be called an "SPCCI lean region."

<Medium Load Region (1)-2>

When the engine body 2 operates in the medium load region (1)-2, the engine 2 performs SPCCI combustion as in the low load region (1)-1. In the medium load region (1)-2, the engine 1 similarly controls the specifications (the closing timing of the intake valve 21 and the boost pressure) so that the effective compression ratio of the engine body 2 is 12:1 or more with a difference from the geometric compression ratio of the engine body 2 being within 2.

Reference character 602 in FIG. 8 indicates an example of the fuel injection timings (reference characters 6021, 6022), the ignition timing (reference character 6023), and the combustion waveform (reference character 6024) when the engine body 2 operates in an operating state 602 in the medium load region (1)-2.

The EGR system 55 similarly introduces the EGR gas into the combustion chamber 17 when the engine body 2 operates in the medium load region (1)-2.

Specifically, in the medium load region (1)-2, a positive overlap period during which both the intake valve 21 and the exhaust valve 22 are open is provided near the exhaust top dead center as in the low load region (1)-1, so that the internal EGR is performed during the positive overlap period. In the internal EGR, a part of the exhaust gas discharged from the combustion chamber 17 into the intake port 18 and the exhaust port 19 is introduced back into the combustion chamber 17. That is, the internal EGR gas is introduced into the combustion chamber 17.

As in the low load region (1)-1, the opening timing $T_{IVO}$ of the intake valve 21 is set to a fixed or substantially fixed timing within the crank angle range of ±5° in the entire region in the load direction and the entire region in the rotational speed direction in the medium load region (1)-2. The opening timing $T_{IVO}$ of the intake valve 21 is preferably fixed to a certain timing. In this example, as shown in FIG. 9, the opening timing $T_{IVO}$ of the intake valve 21 is fixed to the same certain timing as in the low load region (1)-1, for example, to 30° C.A before the compression top dead center.

As in the low load region (1)-1, the closing timing $T1_{EVC}$ of the exhaust valve 22 is also set to a fixed or substantially fixed timing within the crank angle range of ±5° in the entire region in the load direction and the entire region in the rotational speed direction in the medium load region (1)-2. The closing timing $T1_{EVC}$ of the exhaust valve 22 is preferably fixed to a certain timing. In this example, as shown in FIG. 10, the closing timing $T1_{EVC}$ of the exhaust valve 22 is fixed to the same certain timing as in the low load region (1)-1, for example, to 16.5° C.A after the compression top dead center.

The opening timing $T_{IVO}$ and the closing timing $T_{IVC}$ of the intake valve 21 and the opening timing $T1_{EVO}$ and the closing timing $T1_{EVC}$ of the exhaust valve 22 are thus set so that the positive overlap period is equal to or longer than the same predetermined crank angle range (40° C.A) as in the low load region (1)-1, as shown by the valve lift curve 121 of the intake valve 21 shown by solid line in FIG. 11 and the valve lift curve 221 of the exhaust valve 22 shown by dashed line in FIG. 11. For example, the positive overlap period is set to a period of 46.5° C.A including the compression top dead center.

When the closing timing $T_{IVC}$ of the intake valve 21 is set according to this overlap period, the effective compression ratio of the engine body 2 can be similarly set to 12 or more with a difference from the geometric compression ratio of the engine body 2 being within 2 in the medium load region (1)-2.

The supercharger 44 is turned off when the engine body 2 operates in a part of the medium load region (1)-2. Specifically, the supercharger 44 is turned off in a low load, low rotational speed region of the medium load region (1)-2 (see S/C OFF). In a high load region of the medium load region (1)-2, the supercharger 44 is turned on to increase the boost pressure in order to ensure a required intake charge as the rotational speed of the engine body 2 increases. In a high rotational speed region of the medium load region (1)-2, the supercharger 44 is turned on to increase the boost pressure in order to ensure a required intake charge as the rotational speed of the engine body 2 increases.

When the supercharger 44 is off and the gas in the intake passage 40 is not supercharged, the pressure in the intake passage 40 is relatively low. Accordingly, the internal EGR gas (hot burned gas) is introduced into the combustion chamber 17 during the positive overlap period as described above. The temperature in the combustion chamber 17 thus increases, which is advantageous in stabilizing SPCCI combustion in the low load, low rotational speed region of the medium load region (1)-2.

When the supercharger 44 is on and the gas in the intake passage 40 is supercharged, the pressure in the intake passage 40 is relatively high. Accordingly, the gas (hot burned gas) remaining in the combustion chamber 17 is scavenged during the positive overlap period as described above. The temperature in the combustion chamber 17 thus decreases, which is advantageous in obtaining higher torque in the high load region and the high rotational speed region of the medium load region (1)-2.

In the medium load region (1)-2, external EGR is performed. In the external EGR, the exhaust gas cooled by the EGR cooler 53 through the EGR passage 52 is introduced into the combustion chamber 17. That is, the external EGR gas having a lower temperature than the internal EGR gas is introduced into the combustion chamber 17. As shown in FIG. 12, the EGR rate of the external EGR, i.e., the proportion of the external EGR gas to the total amount of gas that is introduced into the combustion chamber 17, is adjusted as appropriate within the range of 20% or more and 25% or less by mass. In the medium load region (1)-2, at least one of the internal EGR gas and the external EGR gas is introduced into the combustion chamber 17 to appropriately adjust the temperature in the combustion chamber 17.

As in the low load region (1)-1, the swirl control valve 56 is fully closed or at a predetermined angle on the valve closing side when the engine body 2 operates in the medium load region (1)-2. A strong swirl flow with a swirl ratio of 4 or more is thus produced in the combustion chamber 17. When the swirl flow becomes stronger, turbulent energy in the combustion chamber 17 increases accordingly. The flame of SI combustion therefore rapidly propagates and SI combustion is stabilized. Since SI combustion is stabilized, controllability of CI combustion is improved. CI combustion is thus performed at an appropriate timing in SPCCI combustion. As a result, combustion noise is reduced, and fuel efficiency is improved. Moreover, variation in torque between cycles is reduced.

When the engine body 2 operates in the medium load region (1)-2, the overall air-fuel ratio (A/F) of the air-fuel mixture in the combustion chamber 17 is set to the stoichiometric air-fuel ratio (A/F=14.7). At the stoichiometric air-fuel ratio, the three-way catalysts controls the exhaust gas discharged from the combustion chamber 17, and the engine 1 has satisfactory emission performance. The A/F of the air-fuel mixture is set within the operating window of the three-way catalysts. The excess air ratio λ of the air-fuel mixture is therefore set to 1.0±0.2.

When the engine body 2 operates in the medium load region (1)-2, the injector 6 injects fuel into the combustion chamber 17 in the intake stroke and the compression stroke (reference characters 6021, 6022). Specifically, a first injection 6021 is performed during the period from the middle stage to the final stage of the intake stroke, and a second injection 6022 is performed in the second half of the compression stroke. The middle and final stages of the intake stroke are the middle and final stages of the intake stroke divided into three equal parts, namely the initial, middle, and final stages, according to the crank shaft. The first and second halves of the compression stroke are the first and second halves of the compression stroke divided into two halves according to the crank angle.

The first injection 6021 is performed at a timing away from the ignition timing. Since the piston 3 is located away from the top dead center at the time of the injection, fuel injected by the first injection 6021 also reaches a squish area 171 formed in a region outside the cavity 31 and is distributed substantially uniformly in the combustion chamber 17 to form an air-fuel mixture. The second injection 6022 is performed at a timing the piston 3 is located near the compression top dead center. Fuel injected by the second injection 6022 therefore enters the cavity 31 and forms an air-fuel mixture in a region inside the cavity 31.

As the fuel is injected into the cavity 31 by the second injection 6022, the gas flows in the region inside the cavity 31. When there is a long time until the ignition timing, turbulent energy in the combustion chamber 17 attenuates as the compression stroke proceeds. However, since the timing of the second injection 6022 is closer to the ignition timing than the timing of the first ignition 6021 is, the spark plug 25 can ignite the air-fuel mixture in the region inside the cavity 31 when the turbulent energy in the cavity 31 is still high. The combustion rate of SI combustion thus increases. As the combustion rate of SI combustion increases, SI combustion is stabilized, and controllability of CI combustion by SI combustion is improved.

The second injection 6022 is performed in the second half of the compression stroke. Accordingly, when the load is high in the medium load region (1)-2, the temperature in the combustion chamber 17 is reduced by the latent heat of vaporization of the fuel. This reduces or eliminates the possibility that abnormal combustion such as pre-ignition and knocking may be induced. Moreover, the fuel injected by the second injection 6022 is stably burned by flame propagation. For example, the ratio of the amount of fuel injected by the first injection 6021 to the amount of fuel injected by the second injection 6022 may be 95:5. In the medium load region (1)-2, the second injection 6022 may be omitted when the engine body 2 operates in a low load operating state.

As the injector 6 performs the first injection 6021 and the second injection 6022, a substantially homogeneous air-fuel mixture having an overall excess air ratio λ of 1.0±0.2 is formed in the combustion chamber 17. Since the air-fuel mixture is substantially homogeneous, fuel efficiency is improved due to reduction in unburned fuel loss. Moreover, emission performance is improved as generation of smoke (soot) is avoided. The excess air ratio λ is preferably 1.0 or more and 1.2 or less.

The spark plug 25 ignites the air-fuel mixture at a predetermined timing before the compression top dead center (reference character 6023). The air-fuel mixture is thus burned by flame propagation. After the combustion by flame propagation is started, the unburned air-fuel mixture is self-ignited to cause CI combustion. The fuel injected by the second injection 6022 is mainly burned by SI combustion. The fuel injected by the first injection 6021 is mainly burned by CI combustion.

As described above, in the middle load region (1)-2, the engine 1 performs SPCCI combustion using an air-fuel mixture having the stoichiometric air-fuel ratio. The medium load region (1)-2 can therefore be called an "SPCCI λ=1 region."

<High Load, Medium Rotational Speed Region (2)>

When the engine body 2 operates in the high load, medium rotational speed region (2), the engine 1 performs SPCCI combustion as in the low load region (1)-1 and the middle load region (1)-2. When the engine 1 performs SPCCI combustion in the medium load region (1)-2, the engine 1 similarly controls the specifications (the closing timing of the intake valve 21 and the boost pressure) so that the effective compression ratio of the engine body 2 is 12:1 or more with a difference from the geometric compression ratio of the engine body 2 being within 2.

Reference character 603 in FIG. 8 indicates an example of the fuel injection timings (reference characters 6031, 6032), the ignition timing (reference character 6033), and the combustion waveform (reference character 6034) when the engine body 2 operates in an operating state 603 in a lower rotational speed region of the high load, medium rotational speed region (2). Reference character 604 in FIG. 8 indicates an example of the fuel injection timing (reference character 6041), the ignition timing (reference character 6042), and the combustion waveform (reference character 6043) when the engine body 2 operates in an operating state 604 in a higher rotational speed region of the high load, medium rotational speed region (2).

The EGR system 55 also introduces the EGR gas into the combustion chamber 17 when the engine body 2 operates in the high load, medium rotational speed region (2).

Specifically, in the high load, medium rotational speed region (2), the external EGR is also performed. In the external EGR, the exhaust gas cooled by the EGR cooler 53 through the EGR passage 52 is introduced into the combustion chamber 17. As shown in FIG. 12, the EGR rate of the external EGR is adjusted as appropriate within the range of 25% or more and 35% or less by mass. In the high load, medium rotational speed region (2), the external EGR gas is introduced into the combustion chamber 17 to appropriately adjust the temperature in the combustion chamber 17.

Figure 13:
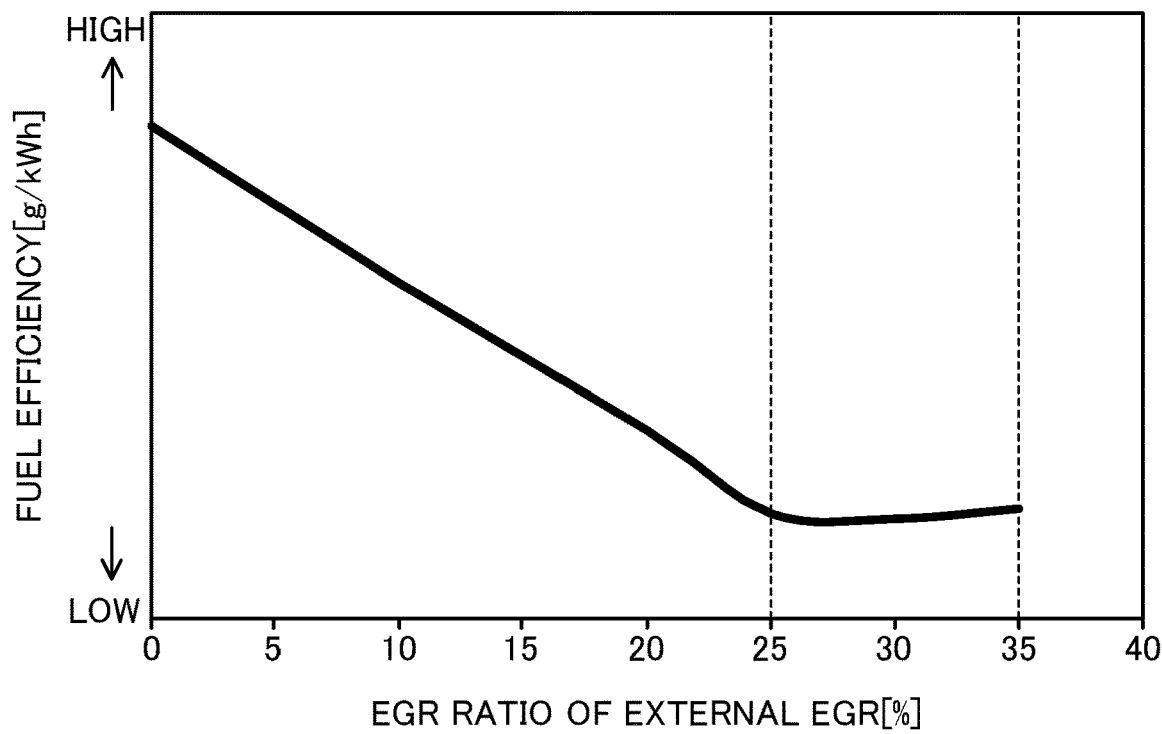
FIG. 13 is a graph illustrating the relationship between the EGR ratio of external EGR and the fuel efficiency in a high load region.

FIG. 13 shows the relationship between the EGR rate of the external EGR and the fuel efficiency in the high load region. As shown in FIG. 13, when the engine body 2 operates in the high load region, the fuel efficiency of the engine 1 is expected to improve until the proportion of the external EGR gas to the total amount of gas that is introduced into the combustion chamber 17 increases to 25% by mass. In this range of the proportion, the higher the proportion is, the more the fuel efficiency of the engine 1 is expected to improve. When the proportion becomes larger than 35% by mass, however, SI combustion becomes abruptly unstable and therefore improvement in fuel efficiency of the engine 1 is hardly expected. Accordingly, as shown in FIG. 13, it is preferable to adjust the EGR ratio of the external EGR in the range of 25% or more and 35% or less by mass in order to improve fuel efficiency.

In the high load, medium rotational speed region (2), a positive overlap period during which both the intake valve 21 and the exhaust valve 22 are open is provided near the exhaust top dead center as in the low load region (1)-1 and the medium load region (1)-2.

As in the low load region (1)-1 and the medium load region (1)-2, the opening timing $T_{IVO}$ of the intake valve 21 is set to a fixed or substantially fixed timing within the crank angle range of ±5° in the entire region in the load direction and the entire region in the rotational speed direction in the high load, medium rotational speed region (2). In this example, as shown in FIG. 9, the opening timing $T_{IVO}$ of the intake valve 21 is fixed to the same certain timing as in the low load region (1)-1, for example, to 30° C.A before the compression top dead center.

As in the low load region (1)-1 and the medium load region (1)-2, a closing timing $T2_{EVC}$ of the exhaust valve 22 is also set to a fixed or substantially fixed timing within the crank angle range of ±5° in the entire region in the load direction and the entire region in the rotational speed direction in the high load, medium rotational speed region (2). In this example, as shown in FIG. 10, the closing timing $T2_{EVC}$ of the exhaust valve 22 is fixed to a certain timing retarded with respect to that in the low load region (1)-1, for example, to 30° C.A after the compression top dead center.

The opening timing $T_{IVO}$ and the closing timing $T_{IVC}$ of the intake valve 21 and an opening timing $T2_{EVO}$ and the closing timing $T2_{EVC}$ of the exhaust valve 22 are thus set so that the positive overlap period is equal to or longer than a predetermined crank angle range (40° C.A) that is larger than in the low load region (1)-1 and the medium load region (1)-2, as shown by the valve lift curve 121 of the intake valve 21 shown by solid line in FIG. 11 and a valve lift curve 222 of the exhaust valve 22 shown by solid line in FIG. 11. In the above example of the opening timing of the intake valve 21 and the closing timing of the exhaust valve 22, the positive overlap period is set to a period of 60° C.A including the compression top dead center.

When the closing timing $T_{IVC}$ of the intake valve 21 is set according to this overlap period, the effective compression ratio of the engine body 2 can also be set to 12:1 or more with a difference from the geometric compression ratio of the engine body 2 being within 2 in the high load, medium rotational speed region (2).

When the engine body 2 operates in the high load, medium rotational speed region (2), the supercharger 44 is on in the entire high load, medium rotational speed region (2) to increase the boost pressure (see S/C ON). Accordingly, the gas (burned gas) remaining in the combustion chamber 17 is scavenged during the positive overlap period as described above. The temperature in the combustion chamber 17 thus decreases, which is advantageous in obtaining higher torque in the high load, medium rotational speed region (2).

When the engine body 2 operates in the high load, medium rotational speed region (2), the swirl control valve 56 is also fully closed or at a predetermined angle on the valve closing side as in the low load region (1)-1. A strong swirl flow with a swirl ratio of 4 or more is thus produced in the combustion chamber 17.

When the engine body 2 operates in the high load, medium rotational speed region (2), the overall air-fuel ratio (A/F) of the air-fuel mixture in the combustion chamber 17 is the stoichiometric air-fuel ratio or richer than the stoichiometric air-fuel ratio (i.e., the excess air ratio λ of the air-fuel mixture, λ≥1).

When the engine body 2 operates in the operating state 603 in the high load, medium rotational speed region (2), the injector 6 injects fuel into the combustion chamber 17 in the intake stroke and the compression stroke (reference characters 6031, 6032). Specifically, a first injection 6031 is performed during the period from the middle stage to the final stage of the intake stroke, and a second injection 6032 is performed in the final stage of the compression stroke. The first injection 6031 may be started in the first half of the intake stroke. For example, the first injection 6031 may be started 280° C.A before the compression top dead center. The second injection 6032 may be performed in the middle stage of the compression stroke as long as it is in the second half of the compression stroke.

When the first injection 6031 is started in the first half of the intake stroke, the fuel spray hits the opening edge of the cavity 31. A part of the fuel therefore enters the squish area 171 of the combustion chamber 17, namely the region outside the cavity 31 (see FIG. 2), and the remaining fuel enters the cavity 31. At this time, the swirl flow is strong in the outer peripheral portion of the combustion chamber 17 and is weak in the central portion of the combustion chamber 17.

Accordingly, the fuel having entered the cavity 31 reaches the inside of the swirl flow. The fuel having entered the swirl flow stays in the swirl flow from the intake stroke to the compression stroke and forms an air-fuel mixture for CI combustion in the outer peripheral portion of the combustion chamber 17. The fuel having reached the inside of the swirl flow stays inside of the swirl flow from the intake stroke to the compression stroke and forms an air-fuel mixture for SI combustion in the central portion of the combustion chamber 17.

When the engine body 2 operates in the high load high rotational speed region (2), the first injection 6031 and the second injection 6032 are performed so that the fuel concentration of the air-fuel mixture becomes higher in the outer peripheral portion of the combustion chamber 17 than in the central portion of the combustion chamber 17 and the amount of fuel in the air-fuel mixture becomes larger in the outer peripheral portion of the combustion chamber 17 than in the central portion of the combustion chamber 17. Accordingly, a larger amount of fuel is injected in the first injection 6031 than in the second injection 6032.

Specifically, the excess air ratio λ of the air-fuel mixture in the central portion of the combustion chamber 17 is preferably 1 or less, and the excess air ratio λ of the air-fuel mixture in the outer peripheral portion of the combustion chamber 17 is 1 or less, and preferably less than 1. For example, the air-fuel ratio (A/F) of the air-fuel mixture in the central portion of the combustion chamber 17 may be 13 or more and the stoichiometric air-fuel ratio (14.7) or less. The air-fuel ratio of the air-fuel mixture in the central portion of the combustion chamber 17 may be leaner than the stoichiometric air-fuel ratio.

For example, the air-fuel ratio of the air-fuel mixture in the outer peripheral portion of the combustion chamber 17 may be 11 or more and the stoichiometric air-fuel ratio or less, and preferably 11 or more and 12 or less. When the excess air ratio λ in the outer peripheral portion of the combustion chamber 17 is less than 1, the air-fuel mixture in the outer peripheral portion of the combustion chamber 17 contains an increased amount of fuel. The temperature in the outer peripheral portion of the combustion chamber 17 therefore decreases due to the latent heat of vaporization of the fuel. The overall air-fuel ratio of the air-fuel ratio in the combustion chamber 17 may be 12.5 or more and the stoichiometric air-fuel ratio or less and may be preferably 12.5 or more and 13 or less.

For example, the second injection 6032 may be started 10° C.A before the compression top dead center. Since the second injection 6032 is performed immediately before the compression top dead center, the temperature in the combustion chamber 17 can be reduced by the latent heat of vaporization of the fuel. A low temperature oxidation reaction of the fuel injected by the first injection 6031 proceeds during the compression stroke but switches to a high temperature oxidation reaction before the compression top dead center. However, since the second injection 6032 is performed immediately before the compression top dead center to reduce the temperature in the combustion chamber 17, the low temperature oxidation reaction is restrained from switching to the high temperature oxidation reaction, and occurrence of abnormal combustion such as pre-ignition and knocking is reduced. For example, the ratio of the amount of fuel that is injected in the first injection 6031 to the amount of fuel that is injected in the second injection 6032 may be 95:5.

The spark plug 25 ignites the air-fuel mixture in the combustion chamber 17 at a timing near the compression top dead center (reference character 6033). Since the spark plug 25 is disposed in the central portion of the combustion chamber 17, SI combustion of the air-fuel mixture by flame propagation is started in the central portion of the combustion chamber 17 by ignition of the spark plug 25.

When the engine body 2 operates in the operation region 604 in the high load, medium rotational speed region (2), the injector 6 starts fuel injection in the intake stroke (reference character 6041). As the rotational speed of the engine body 2 increases, the time for the chemical reaction of the fuel injected by the fuel injection 6041 to proceed is reduced. The second injection for inhibiting the reaction of the air-fuel mixture can be omitted.

Specifically, the fuel injection 6041 may be started 280° C.A before the compression top dead center. The fuel injection 6041 may sometimes be finished during the compression stroke after the intake stroke. As the fuel injection 6041 is started in the first half of the intake stroke, an air-fuel mixture for CI combustion is formed in the outer peripheral portion of the combustion chamber 17, and an air-fuel mixture for SI combustion is formed in the central portion of the combustion chamber 17, as described above.

As described above, the excess air ratio λ of the air-fuel mixture in the central portion of the combustion chamber 17 is preferably 1 or less, and the excess air ratio λ of the air-fuel mixture in the outer peripheral portion of the combustion chamber 17 is 1 or less, and preferably less than 1. For example, the air-fuel ratio (A/F) of the air-fuel mixture in the central portion of the combustion chamber 17 may be 13 or more and the stoichiometric air-fuel ratio (14.7) or less. The air-fuel ratio of the air-fuel mixture in the central portion of the combustion chamber 17 may be leaner than the stoichiometric air-fuel ratio.

For example, the air-fuel ratio of the air-fuel mixture in the outer peripheral portion of the combustion chamber 17 may be 11 or more and the stoichiometric air-fuel ratio or less, and may be preferably 11 or more and 12 or less. The overall air-fuel ratio of the air-fuel mixture in the combustion chamber 17 may be 12.5 or more and the stoichiometric air-fuel ratio or less and may be preferably 12.5 or more and 13 or less.

The spark plug 25 ignites the air-fuel mixture in the combustion chamber 7 at or after the compression top dead center near the compression top dead center (reference character 6042). Since the spark plug 25 is disposed in the central portion of the combustion chamber 17, SI combustion of the air-fuel mixture by flame propagation is started in the central portion of the combustion chamber 17 by ignition of the spark plug 25.

In the high load, medium rotational speed region (2), an increased amount of fuel is injected and the temperature in the combustion chamber 17 increases. Accordingly, CI combustion tends to start early in this situation. In other words, in the high load, medium rotational speed region (2), abnormal combustion such as pre-ignition of the air-fuel mixture and knocking tends to occur. However, the temperature in the outer peripheral portion of the combustion chamber 17 decreases due to the latent heat of vaporization of the fuel, as described above. This avoids CI combustion from starting immediately after spark ignition of the air-fuel mixture.

In SPCCI combustion in the high load, medium rotational speed region (2), the air-fuel mixture is stratified in the combustion chamber 17, and a strong swirl flow is produced in the combustion chamber 17. SI combustion can therefore be sufficiently performed before the start of CI combustion. As a result, combustion noise is reduced, and production of $NO_x$ is also reduced as the combustion temperature does not become too high. Moreover, variation in torque between cycles is reduced.

The low temperature in the outer peripheral portion of the combustion chamber 17 is advantageous in reducing combustion noise as CI combustion proceeds slowly. Moreover, since the combustion period is reduced by CI combustion, improved torque and improved thermal efficiency are achieved in the high load, medium rotational speed region (2). As the engine 1 performs SPCCI combustion in the high load region, emission performance is improved while avoiding combustion noise.

As described above, in the high load, medium rotational speed region (2), the engine 1 performs SPCCI combustion using an air-fuel mixture having the stoichiometric air-fuel ratio or richer than the stoichiometric air-fuel ratio. The high load, medium rotational speed region (2) can therefore be called an "SPCCI 1 region."

<High Load, Low Rotational Speed Region (3)>

When the rotational speed of the engine body 2 is low, it takes longer for the crank angle to change by 1°. In the high load, low rotational speed region (3), when fuel is injected into the combustion chamber 17, for example, in the intake stroke or in the first half of the compression stroke as in the high load, medium rotational speed region (2), the reaction of the fuel may proceed excessively, causing abnormal combustion such as pre-ignition. The engine 1 therefore performs SI combustion rather than SPCCI combustion when the engine body 2 operates in the high load, low rotational speed region (3).

In the high load, low rotational speed region (3), the engine 1 similarly controls the specifications (the closing timing of the intake valve 21 and the boost pressure) so that the effective compression ratio of the engine body 2 is 12:1 or more with a difference from the geometric compression ratio of the engine body 2 being within 2. A reference character 605 in FIG. 8 indicates an example of the fuel injection timings (reference characters 6051, 6052), the ignition timing (reference character 6053), and the combustion waveform (reference character 6054) when the engine body 2 operates in an operating state 605 in the high load, low rotational speed region (3).

When the operating state of the engine body 2 is in the high load, low rotational speed region (3), the EGR system 55 introduces the EGR gas into the combustion chamber 17. The engine 1 reduces the amount of EGR gas as the load of the engine body 2 increases. At the full open load, the amount of EGR gas is zero.

When the engine body 2 operates in the high load, low rotational region (3) as well, the supercharger 44 is on in the entire high load, low rotational region (3) to increase the boost pressure (see S/C ON). Accordingly, the gas remaining in the combustion chamber 17 is scavenged during the positive overlap period. The temperature in the combustion chamber 17 thus decreases, thereby implementing higher torque of the engine 1.

When the engine body 2 operates in the high load, low-rotational speed range (3), the overall air-fuel ratio (A/F) of the air-fuel mixture in the combustion chamber 17 is the stoichiometric air-fuel ratio (A/F=14.7). The A/F of the air-fuel mixture is set within the operating window of the three-way catalysts. The excess air ratio λ of the air-fuel mixture is therefore set to 1.0±0.2. Since the air-fuel ratio of the air-fuel mixture is the stoichiometric air-fuel ratio, fuel efficiency is improved in the high load, low rotational speed region (3).

When the engine body 2 operates in the high load, low rotational speed region (3), the overall fuel concentration of the air-fuel mixture in the combustion chamber 17 may be 1 or less in the excess air ratio λ and equal to or higher than the excess air ratio λ in the high load, medium rotational speed region (2), and preferably higher than the excess air ratio λ in the high load, medium rotational speed region (2).

When the engine body 2 operates in the high load, low rotational speed region (3), the injector 6 injects fuel into the combustion chamber 17 in the intake stroke and in the period around the compression top dead center (reference characters 6051, 6052). Specifically, a first injection 6051 is performed in the period from the middle to final stages of the intake stroke, and a second injection 6052 is performed in the period from the final stage of the compression stroke to the initial stage of the expansion stroke (hereinafter, this period is referred to as the retard period). The initial stage of the expansion stroke is the initial stage of the expansion stroke divided into three equal parts, namely the initial, middle, and final stages.

As fuel is injected during the intake stroke by the first injection 6051, there is enough time to form an air-fuel mixture. Moreover, as fuel is injected in the retard period by the second injection 6052, the strength of the gas flow in the combustion chamber 17 is increased immediately before ignition. For example, the fuel pressure is set to a value as high as 30 MPa or more. Increasing the fuel pressure reduces the fuel injection period and the air-fuel mixture formation period and further increases the strength of the gas flow in the combustion chamber 17. For example, the upper limit of the fuel pressure may be 120 MPa.

The spark plug 25 ignites the air-fuel mixture at a timing near the compression top dead center after the fuel injection (reference character 6053). For example, the spark plug 25 may ignite the air-fuel mixture after the compression top dead center. In this case, the air-fuel mixture is burned by SI combustion in the expansion stroke. Since SI combustion starts in the expansion stroke, CI combustion does not start.

The lower the rotational speed of the engine 1 is, the more the timing of fuel injection by the injector 6 may be retarded in order to avoid pre-ignition. Fuel injection may sometimes be finished in the expansion stroke due to such retardation of the fuel injection timing. Accordingly, when the engine 1 operates in the high load, low rotational region (3), the time from the start of fuel injection to ignition is short. In order to improve ignitability of the air-fuel mixture and stabilize SI combustion, it is necessary to quickly transport fuel to a position near the spark plug 25. The shape of the combustion chamber 17 contributes to implementation of such quick transport of the fuel.

When the injector 6 injects fuel in the retard period, the piston 3 is located near the compression top dead center. Accordingly, the fuel spray forms an air-fuel mixture while mixing with fresh air. The air-fuel mixture thus formed flows downward along the protruding portion 311 of the cavity 31 and spreads radially outward in a radial pattern from the center of the combustion chamber 17 along the bottom surface and the peripheral side surface of the cavity 31. The air-fuel mixture then reaches the opening of the cavity 31 and flows from the outer side in the radial direction toward the center of the combustion chamber along the tilted surface 1311 on the intake side and the tilted surface 1312 on the exhaust side. The fuel injected in the retarded period is thus rapidly transported as an air-fuel mixture to a position near the spark plug 25.

When the engine body 2 operates the high load, low rotational speed region (3), the opening degree of the swirl control valve 56 in the engine 1 is larger than when the engine body 2 operates in the high load, medium rotational speed region (2). The opening degree of the swirl control valve 56 is, e.g., about 50% (i.e., half open). The swirl flow is thus weaker than when the engine body 2 operates in the high load, medium rotational speed region (2).

As shown in the upper part of FIG. 2, the positions of the axes of the nozzle holes of the injector 6 are offset in the circumferential direction with respect to the spark plug 25. Fuel injected from the nozzle holes flows in the circumferential direction of the combustion chamber 17 due to the swirl flow in the combustion chamber 17. The fuel is thus quickly transported to the position near the spark plug 25. The fuel is vaporized while being transported to the position near the spark plug 25.

When the swirl flow is too strong, the fuel is moved away from the spark plug 25 in the circumferential direction. The fuel therefore cannot be quickly transported to the position near the spark plug 25. Accordingly, when the engine 1 operates in the high load, low rotational speed region (3), the swirl flow is made weaker than when the engine 1 operates in the high load, medium rotational speed region (2). The fuel is thus quickly transported to the position near the spark plug 25, whereby ignitability of the air-fuel mixture is improved, and SI combustion is stabilized.

As described above, in the high load, low rotational speed region (3), the engine 1 performs SI combustion by injecting fuel in the retard period, namely the period from the final stage of the compression stroke to the initial stage of the expansion stroke. The high load, low rotational speed region (3) can therefore be called a "retard-SI region."

<High Rotational Speed Region (4)>

When the rotational speed of the engine 1 is high, it takes a shorter period of time for the crank angle to change by 1°. Accordingly, in, e.g., a high rotational speed region of the high load region, it is difficult to stratify the air-fuel mixture in the combustion chamber 17 by performing fuel injection a plurality of times as described above. The engine 1 therefore performs SI combustion rather than SPCCI combustion when the engine body 2 operates in the high rotational speed region (4).

In the high rotational speed region (4), the engine 1 similarly controls the specifications (the closing timing of the intake valve 21 and the boost pressure) so that the effective compression ratio of the engine body 2 is 12 or more with a difference from the geometric compression ratio of the engine body 2 being within 2. The high rotational speed region (4) extends in the entire region in the load direction from low load to high load.

Reference character 606 in FIG. 8 indicates an example of the fuel injection timing (reference character 6061), the ignition timing (reference character 6062), and the combustion waveform (reference character 6063) when the engine body 2 operates in an operating state 606 in the high rotational speed region (4).

When the operating state of the engine body 2 is in the high rotational speed region (4), the EGR system 55 introduces the EGR gas into the combustion chamber 17. The engine 1 reduces the amount of EGR gas as the load of the engine body 2 increases. At the full open load, the amount of EGR gas is zero.

When the engine body 2 operates in the high rotational region (4) as well, the supercharger 44 is on in the entire high rotational region (4) to increase the boost pressure (see S/C ON). Accordingly, the gas remaining in the combustion chamber 17 is scavenged during the positive overlap period. The temperature in the combustion chamber 17 thus decreases, thereby implementing higher torque of the engine 1.

When the engine body 2 operates in the high rotational speed region (4), the swirl control valve 56 of the engine 1 is fully opened. Accordingly, no swirl flow is produced in the combustion chamber 17, and only a tumble flow is produced in the combustion chamber 17. Fully opening the swirl control valve 56 enhances charging efficiency and reduces pumping loss in the high rotational speed region (4).

When the engine body 2 operates in the high rotational speed range (4), the overall air-fuel ratio (A/F) of the air-fuel mixture in the combustion chamber 17 is basically the stoichiometric air-fuel ratio (A/F=14.7). The excess air ratio λ of the air-fuel mixture is 1.0±0.2. In a high load region including full load in the high rotational speed region (4), the excess air ratio λ of the air-fuel mixture may be less than 1.

When the engine body 2 operates in the high rotational speed region (4), the injector 6 starts fuel injection in the intake stroke. In this case, the injector 6 injects fuel at a time (reference character 6061). In an operating state 605, a large amount of fuel is injected as the load of the engine body 2 is high. The fuel injection period varies depending on the amount of fuel to be injected. Since the fuel injection is thus started during the intake stroke, a homogenous or substantially homogenous air-fuel mixture is formed in the combustion chamber 17. Moreover, the time for vaporization of the fuel can be increased as much as possible when the rotational speed of the engine body 2 is high. Accordingly, unburned fuel loss and generation of soot are reduced.

After the fuel injection is finished, the spark plug 25 ignites the air-fuel mixture at an appropriate timing before the compression top dead center (reference character 6062).

As described above, in the high rotational speed region (4), the engine 1 starts fuel injection in the intake stroke to perform SI combustion. The high rotational speed region (4) can therefore be called an "intake-SI region."

<Engine Control Process>

Figure 16:
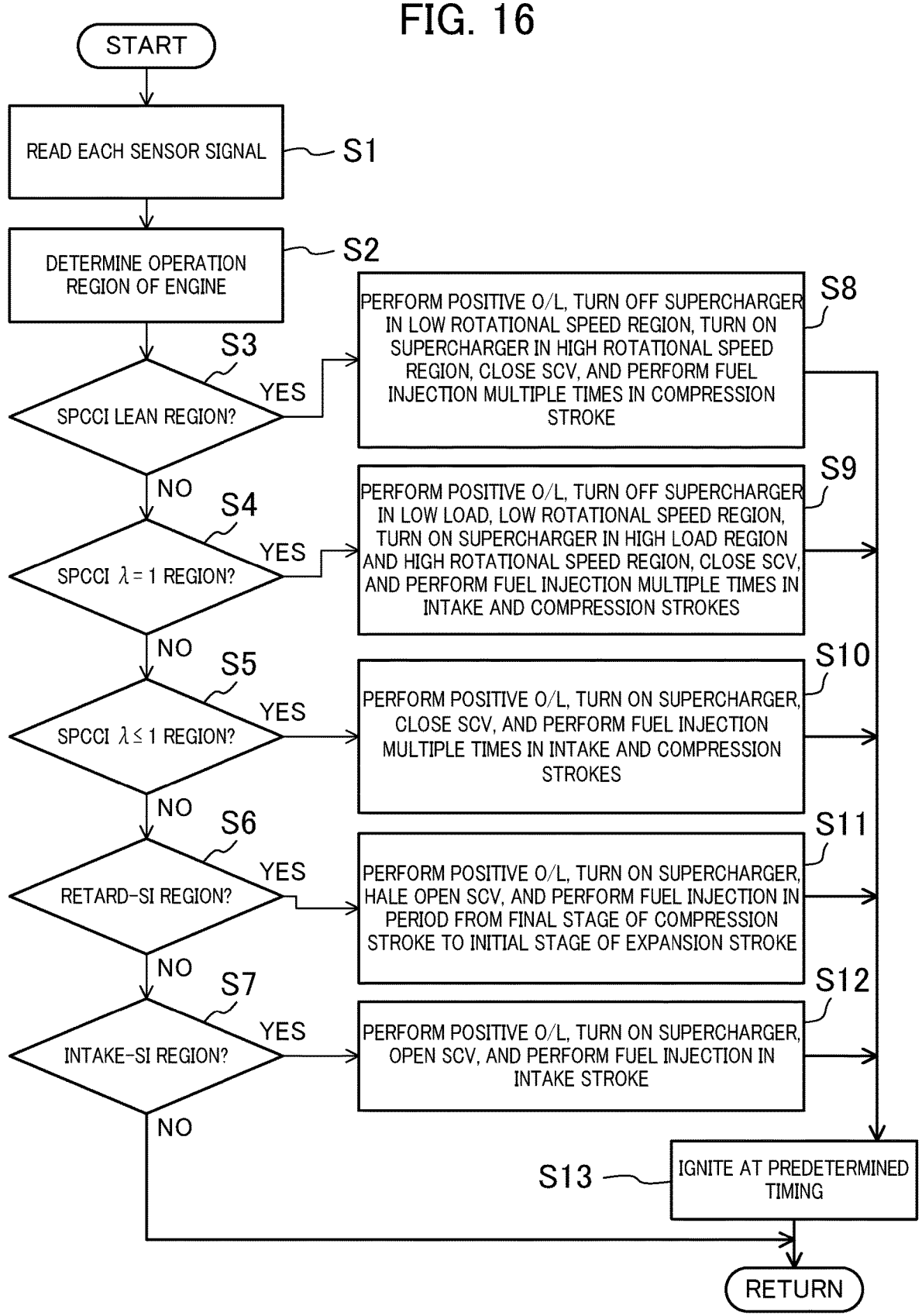
FIG. 16 is a flowchart illustrating a control process for the engine.

Next, operation control for the engine 1 which is performed by the ECU 10 will be described with reference to the flowchart of FIG. 16.

First, in step S1 after startup, the ECU 10 reads signals from various sensors SW1 to SW16. The ECU 10 then determines the operation region of the engine 1 in a subsequent step S2.

In step S3, the ECU 10 determines whether or not the operation region of the engine 1 is the "SPCCI lean region" (i.e., the low load region (1)-1). When the determination result of step S3 is YES, the process proceeds to step S8. When the determination result of step S3 is NO, the process proceeds to step S4.

In step S4, the ECU 10 determines whether or not the operation region of the engine 1 is the "SPCCI λ=1 region" (i.e., whether or not the operation region of the engine 1 is the medium load region (1)-2). When the determination result of step S4 is YES, the process proceeds to step S9. When the determination result of step S4 is NO, the process proceeds to step S5.

In step S5, the ECU 10 determines whether or not the operation region of the engine 1 is the "SPCCI 1 region" (i.e., the high load, medium rotational speed region (2)). When the determination result of step S5 is YES, the process proceeds to step S10. When the determination result of step S5 is NO, the process proceeds to step S6.

In step S6, the ECU 10 determines whether or not the operation region of the engine 1 is the "retard SI region" (i.e., the high load, low rotational speed region (3)). When the determination result of step S6 is YES, the process proceeds to step S11. When the determination result of step S6 is NO, the process proceeds to step S7.

In step S7, the ECU 10 determines whether or not the operation region of the engine 1 is the "intake SI region" (i.e., the high rotational speed region (4)). When the determination result of step S7 is YES, the process proceeds to step S12. When the determination result of step S7 is NO, the process returns to step S1.

In step S8, the ECU 10 outputs control signals to the intake electric S-VT 23 and the exhaust electric S-VT 24 to adjust the opening timing $T_{IVO}$ of the intake valve 21 and the closing timing $T1_{EVC}$ of the exhaust valve 22 so that the positive overlap period is a predetermined crank range or more and to adjust the closing timing $T_{IVC}$ of the intake valve 21 so that the effective compression ratio of the engine body 2 is within 2 of the geometric compression ratio of the engine body 2. The ECU 10 also outputs a control signal to the supercharging system 49 so that the gas in the intake passage 40 is not supercharged in the low rotational speed region and the gas in the intake passage 40 is supercharged in the high rotational speed region. Accordingly, the internal EGR is performed in the low rotational speed range and the scavenging is performed in the high rotational speed region by switching whether the supercharging system 49 supercharges the gas in the intake passage 40 or not, as described above.

In step S8, the ECU 10 also outputs a control signal to the swirl control valve 56 to close the swirl control valve 56. The ECU 10 further outputs a control signal to the injector 6 to perform the first injection 6011 and the second injection 6012 in the compression stroke as shown by reference character 601 in FIG. 8. A stratified air-fuel mixture is thus formed in the combustion chamber 17 having a strong swirl flow. In a subsequent step S13, the ECU 10 outputs a control signal to the spark plug 25 to ignite the air-fuel mixture at a predetermined timing before the compression top dead center. The engine 1 thus performs SPCCI combustion.

In step S9, the ECU 10 outputs control signals to the intake electric S-VT 23 and the exhaust electric S-VT 24 to adjust the opening timing $T_{IVO}$ of the intake valve 21 and the closing timing $T1_{EVC}$ of the exhaust valve 22 so that the positive overlap period is a predetermined crank range or more and to adjust the closing timing $T_{IVC}$ of the intake valve 21 so that the effective compression ratio of the engine body 2 is within 2 of the geometric compression ratio of the engine body 2. The ECU 10 also outputs a control signal to the supercharging system 49 so that the gas in the intake passage 40 is not supercharged in the lower load, low rotational speed region and the gas in the intake passage 40 is supercharged in the higher load region and the high rotational speed region. Accordingly, the internal EGR is performed in the lower load, low rotational speed region and the scavenging is performed in the high load region and the high rotational speed region by switching whether the supercharging system 49 supercharges the gas in the intake passage 40 or not, as described above.

In step S9, the ECU 10 also outputs a control signal to the swirl control valve 56 to close the swirl control valve 56. The ECU 10 further outputs a control signal to the injector 6 to perform the first injection 6021 in the intake stroke and perform the second injection 6022 in the compression stroke as shown by reference character 602 in FIG. 8. An air-fuel mixture of λ=1 is thus formed in the combustion chamber 17 having a strong swirl flow. In the subsequent step S13, the ECU 10 outputs a control signal to the spark plug 25 to ignite the air-fuel mixture at a predetermined timing before the compression top dead center. The engine 1 thus performs SPCCI combustion.

In step S10, the ECU 10 outputs control signals to the intake electric S-VT 23 and the exhaust electric S-VT 24 to adjust the opening timing $T_{IVO}$ of the intake valve 21 and the closing timing $T2_{EVC}$ of the exhaust valve 22 so that the positive overlap period is a predetermined crank range or more and to adjust the closing timing $T_{IVC}$ of the intake valve 21 so that the effective compression ratio of the engine body 2 is within 2 of the geometric compression ratio of the engine body 2. The ECU 10 also outputs a control signal to the supercharging system 49 so that the gas in the intake passage 40 is supercharged. The scavenging is thus performed as described above.

In step S10, the ECU 10 also outputs a control signal to the swirl control valve 56 to close the swirl control valve 56. The ECU 10 further outputs a control signal to the injector 6 to perform the first injection 6031 in the intake stroke and perform the second injection 6032 in the compression stroke as shown by, e.g., reference character 603 in FIG. 8. A stratified air-fuel mixture is thus formed in the combustion chamber 17 having a strong swirl flow. In the subsequent step S13, the ECU 10 outputs a control signal to the spark plug 25 to ignite the air-fuel mixture at a predetermined timing before the compression top dead center. The engine 1 thus performs SPCCI combustion.

In step S11, the ECU 10 outputs control signals to the intake electric S-VT 23 and the exhaust electric S-VT 24 to adjust the opening timing $T_{IVO}$ of the intake valve 21 and the closing timing $T1_{EVC}$ of the exhaust valve 22 so that the positive overlap period is a crank range required according to the operating state and to adjust the closing timing $T_{IVC}$ of the intake valve 21 so that the effective compression ratio of the engine body 2 is within 2 of the geometric compression ratio of the engine body 2. The ECU 10 also outputs a control signal to the supercharging system 49 so that the gas in the intake passage 40 is supercharged. The scavenging is thus performed as described above in the positive overlap period.

In step S11, the ECU 10 also outputs a control signal to the swirl control valve 56 to half open the swirl control valve 56. The ECU 10 further outputs a control signal to the injector 6 to perform the first injection 6051 in the intake stroke and perform the second injection 6052 in the retard period, namely the period from the final stage of the compression stroke to the initial stage of the expansion stroke as shown by reference character 605 in FIG. 8. In the subsequent step S13, the ECU 10 outputs a control signal to the spark plug 25 to ignite the air-fuel mixture at a predetermined timing after the compression top dead center after the fuel injection is finished. The engine 1 thus performs SI combustion.

In step S12, the ECU 10 outputs control signals to the intake electric S-VT 23 and the exhaust electric S-VT 24 to adjust the opening timing $T_{IVO}$ of the intake valve 21 and the closing timing $T1_{EVC}$ of the exhaust valve 22 so that the positive overlap period is a crank range required according to the operating state and to adjust the closing timing $T_{IVC}$ of the intake valve 21 so that the effective compression ratio of the engine body 2 is within 2 of the geometric compression ratio of the engine body 2. The ECU 10 also outputs a control signal to the supercharging system 49 so that the gas in the intake passage 40 is supercharged. The scavenging is thus performed as described above in the positive overlap period.

In step S12, the ECU 10 also outputs a control signal to the swirl control valve 56 to open the swirl control valve 56. The ECU 10 further outputs a control signal to the injector 6 to perform fuel injection in the intake stroke as shown by reference character 606 in FIG. 8. A homogeneous or substantially homogeneous air-fuel mixture is thus formed in the combustion chamber 17. In the subsequent step S13, the ECU 10 outputs a control signal to the spark plug 25 to ignite the air-fuel mixture at a predetermined timing before the compression top dead center. The engine 1 thus performs SI combustion.

According to the above engine 1, SPCCI combustion is performed when the engine body 2 operates in the low load region (1)-1, the medium load region (1)-2, and the high load medium rotational speed region (2). In SPCCI combustion, a pressure increase in SI combustion due to flame propagation is lower than in CI combustion. Combustion noise is thus reduced. Moreover, since the combustion period of CI combustion is shorter than that of SI combustion, SPCCI combustion is advantageous in improving fuel efficiency.

During SPCCI combustion, the effective compression ratio of the engine body 2 is set less than the geometric compression ratio by 2 or less, and the gas that to be introduced into the combustion chamber 17 is supercharged. Compression ignition is thus reliably performed in the expansion stroke in which the pressure in the combustion chamber 17 decreases. Moreover, high torque, which is required when the load of the engine body 2 is high, is obtained by exploiting the potential for higher torque due to the relatively high geometric compression ratio.

When SPCCI combustion is performed in the high load, medium rotational speed region (2), fuel injection is performed in the second half of the combustion stroke. This restrains the chemical reaction of the air-fuel mixture from proceeding during the period from the fuel injection to ignition and reduces or eliminates the possibility of abnormal combustion such as pre-ignition and knocking during the combustion stroke. Accordingly, CI combustion is appropriately performed even in the high load, medium rotational speed region (2) in which high torque is required. As a result, combustion noise is reduced, and both improved fuel efficiency and higher torque can be achieved.

According to the above engine 1, the gas in the intake passage 40 is supercharged and the overlap period equal to or longer than the predetermined crank angle range is provided when the engine body 2 operates in the high load region (i.e., the high load, medium rotational speed region (2), the high load, low rotational speed region (3), and the high load region of the high rotational speed region (4)). Since the gas pressure in the intake passage 40 is relatively high due to the supercharging, the burned gas remaining in the combustion chamber 17 is caused to flow out of the combustion chamber 17 into the exhaust passage 50 and is thus scavenged during the overlap period. The compression end temperature can thus be reduced, and the effective compression pressure can be increased. The expansion work can therefore be increased.

According to the above engine 1, the effective compression ratio of the engine body 2 is set less than the geometric compression ratio by 2 or less when the engine body 2 operates in the region from the low load region (1)-1 to the high load region (i.e., the high load, medium rotational speed region (2), the high load, low rotational speed region (3), and the high load region of the high rotational speed region (4)). Accordingly, higher torque of the engine body 2 is obtained by exploiting the potential for higher torque due to the relatively high geometric compression ratio.

As described above, in the engine 1 with the supercharging system, the internal EGR is performed in the low load region (1)-1 and the scavenging is performed in the high load region (the high load, medium rotational speed region (2), the high load, low rotational speed region (3), and the high load region of the high rotational speed region (4)) even without significantly changing the opening timing $T_{IVO}$ and the closing timing $T_{IVC}$ of the intake valve 22, namely by switching whether the gas in the intake passage 40 is supercharged or not. Accordingly, even when the load of the engine body 2 changes suddenly, switching between the internal EGR and the scavenging is performed responsively, whereby a sufficient effective compression ratio is obtained and torque is increased. Both improved fuel efficiency and increased torque are therefore achieved when the load of the engine body 2 changes suddenly.

The technique disclosed therein is not limited to the application of the engine 1 having the above configuration. The engine 1 may have various configurations.

Figure 17:
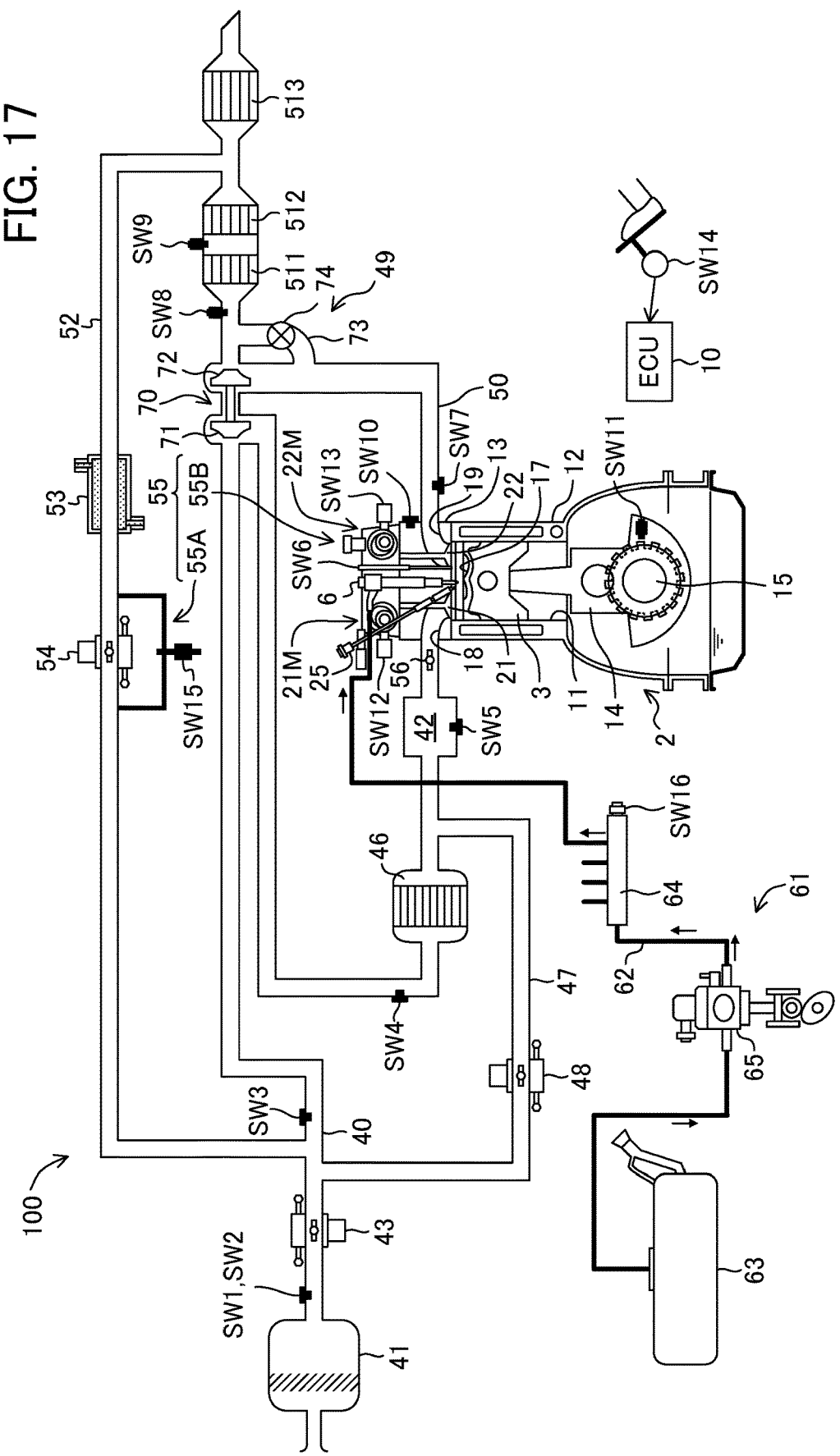
FIG. 17 illustrates a modified configuration of the engine.

FIG. 17 shows a modification of the configuration of the engine 1. For example, as shown in FIG. 17, an engine 100 may include a turbocharger 70 instead of the mechanical supercharger 44.

The turbocharger 70 includes a compressor 71 disposed in the intake passage 40 and a turbine 72 disposed in the exhaust passage 50. The turbine 72 is rotated by the exhaust gas flowing in the exhaust passage 50. The compressor 71 is rotationally driven by the turbine 72 to supercharge the gas in the intake passage 40 to be introduced into the combustion chamber 17.

The exhaust passage 50 is provided with an exhaust bypass passage 73. The exhaust bypass passage 73 connects a part of the exhaust passage 50 which is located upstream of the turbine 72 and a part of the exhaust passage 50 which is located downstream of the turbine 72 so as to bypass the turbine 72. The exhaust bypass passage 73 is provided with a wastegate valve 74. The wastegate valve 74 adjusts the flow rate of the gas flowing in the exhaust bypass passage 50.

In this configuration example, the supercharging system 49 is formed in the intake passage 40 and the exhaust passage 50 by the turbocharger 44, the bypass passage 47, the air bypass valve 48, the exhaust bypass passage 73, and the wastegate valve 74.

The engine 100 opens and closes the air bypass valve 48 and the wastegate valve 74 to switch whether the turbocharger 70 supercharges the gas to be introduced into the combustion chamber 17 or not.

The wastegate valve 74 is opened when the supercharger 70 is not supposed to supercharge the gas to be introduced into the combustion chamber 17. The exhaust gas flowing in the exhaust passage 50 thus bypasses the turbine 72, namely does not flow through the turbine 72, and flows into the catalytic converters through the exhaust bypass passage 73. Since the turbine 72 does not receive the flow of the exhaust gas, the turbine 72 does not drive the turbocharger 70. At this time, the air bypass valve 48 is fully open. The gas flowing in the intake passage 40 thus flows into the surge tank 42 through the bypass passage 47 without passing through the compressor 71 and the intercooler 46.

The wastegate valve 74 is fully closed when the turbocharger 70 is supposed to supercharge the gas to be introduced into the combustion chamber 17. The exhaust gas flowing in the exhaust passage 50 thus flows into the catalytic converters through the turbine 72. The turbine 72 thus receives the exhaust gas and rotates to drive the turbocharger 70. The turbocharger 70 thus driven supercharges the gas in the intake passage 40 by rotation of the compressor 71. When the air bypass valve 48 is open at this time, a part of the gas having passed through the compressor 71 through the bypass passage 47 flows back from the surge tank 42 to a position upstream of the compressor 71 through the bypass passage 47. As in the case of the mechanical supercharger, the boost pressure of the gas in the intake passage 40 can be controlled by adjusting the opening degree of the air bypass valve 48.

For example, whether the turbocharger 70 supercharges the gas in the intake passage 40 or not is switched according to the map 501 shown in FIG. 7. That is, the turbocharger 70 does not supercharges the gas in the intake passage 40 in the low rotational speed region of the low load region (1)-1 and the lower load, low rotational speed region of the medium load region (1)-2, and the turbocharger 70 supercharges the gas in the intake passage 40 in the high rotational speed region of the low road region (1)-1, the higher load region and the high rotational speed region of the medium load region (1)-2, the high load, intermediate rotational speed region (2), the high load, low rotational speed region (3), and the high rotational speed region (4).

In addition to using the intake electric S-VT 23 that changes the phase of the valve timing of the intake valve 21, the technique disclosed herein can also be implemented by using a variable valve train mechanism that changes the lift of the intake valve 21 or a variable valve train mechanism that changes the valve opening angle of the intake valve 21 as the valve train mechanism 21M for the intake valve 21.

In addition to performing the second injection 6032 in the second half of the compression stroke, the technique disclosed herein can also be implemented by performing the second injection 6032 in the first half of the compression stroke.

The technique disclosed herein is widely applicable to engines that perform self-compression ignition combustion and engines that perform combustion by spark ignition in addition to engines that perform SPCCI combustion.

DESCRIPTION OF REFERENCE CHARACTERS

1 Engine
2 Engine Body
6 Injector (Fuel Injection Device)
10 ECU (Control Device)
17 Combustion Chamber
18 Intake Port
19 Exhaust Port
21 Intake Valve
22 Exhaust Valve
23 Intake Electric S-VT
25 Spark Plug (Ignition Device)
44 Supercharger
49 Supercharging System
55A External EGR System
21M Valve Train Mechanism (Variable Valve Train Mechanism) for Intake Valve

The invention claimed is:

1. A premixed compression ignition type engine with a supercharger which performs a four-stroke operation of an intake stroke, a compression stroke, an expansion stroke, and an exhaust stroke while a piston reciprocates twice in a cylinder, comprising:
an engine body having a combustion chamber on a crown surface side of the piston in the cylinder;
a spark plug disposed in the combustion chamber;
a fuel injector disposed so as to face the inside of the combustion chamber;
the supercharger disposed in an intake passage through which a gas to be introduced into the combustion chamber flows; and
a controller, including a processor, that is connected to the spark plug, the fuel injector, and the supercharger and configured to output control signals to the spark plug, the fuel injector, and the supercharger, wherein
a geometric compression ratio of the engine body is set to 13:1 or more, and
when the engine body operates in a preset high load region, the controller is configured to set an effective compression ratio of the engine body to 12:1 or more with a difference from the geometric compression ratio being within 2 so that, after an air-fuel mixture formed by air and fuel mixed in the combustion chamber is ignited by the spark plug and burned by flame propagation, an unburned air-fuel mixture in the combustion chamber is burned by compression ignition, and the controller is also configured to output the control signal to the supercharger to supercharge the gas to be introduced into the combustion chamber, output the control signal to the fuel injector inject fuel in the compression stroke of a combustion cycle, and output the control signal to the spark plug to ignite the air-fuel mixture in the combustion chamber before a compression top dead center after all fuel injection is finished in the combustion cycle.

2. The premixed compression ignition type engine with the supercharger of claim 1, further comprising:
an external EGR (exhaust gas recirculation) system having an EGR passage and connected to the controller, the EGR passage connecting an exhaust passage through which a burned gas discharged from the combustion chamber flows and the intake passage, wherein
when the engine body operates in the preset high load region, the controller is configured to output a control signal to the external EGR system to reduce the temperature of a part of the burned gas flowing in the exhaust passage and then cause the part of the burned gas to flow back into the intake passage to introduce the part of the burned gas into the combustion chamber.

3. The premixed compression ignition type engine with the supercharger of claim 2, wherein
when the engine body operates in the preset high load region, the controller is configured to output the control signal to the external EGR system so that a proportion of the burned gas to a total amount of gas that is introduced into the combustion chamber is 25% to 35% by mass.

4. The premixed compression ignition type engine with the supercharger of claim 1, further comprising:
a variable valve train mechanism provided in the engine body and connected to the controller, wherein
when the engine body operates in the preset high load region, the controller is configured to output a control signal to the variable valve train mechanism to provide a positive overlap period during which both an intake valve that opens and closes an intake port of the engine body and an exhaust valve that opens and closes an exhaust port of the engine body are open to scavenge burned gas remaining in the combustion chamber.

5. The premixed compression ignition type engine with the supercharger of claim 1, wherein
when the engine body operates in the preset high load region, the controller is configured to output the control signal to the fuel injector to perform a first injection in a period from the intake stroke to the first half of the compression stroke and perform a second injection in the compression stroke after the first injection.

6. The premixed compression ignition type engine with the supercharger of claim 1, wherein
the geometric compression ratio of the engine body is set to 15:1 or more.

7. The premixed compression ignition type engine with the supercharger of claim 1, wherein
the fuel injector injects fuel containing gasoline.

8. The premixed compression ignition type engine with the supercharger of claim 1, further comprising:
a variable valve train mechanism provided in the engine body and connected to the controller, wherein
the effective compression ratio of the engine body is adjusted by a closing timing of an intake valve at which the piston starts compression of the gas in the cylinder, and
when the engine body operates in the preset high load region, the controller is configured to output a control signal to the variable valve train mechanism to set the effective compression ratio of the engine body to 12:1 or more with a difference from the geometric compression ratio being within 2.

9. The premixed compression ignition type engine with the supercharger of claim 1, further comprising:
a variable valve train mechanism that can change opening and closing timings of an intake port of the engine body, wherein
the controller is also connected to the variable valve train mechanism,
when the engine body operates in a preset low load region, the controller is configured to output the control signal to the supercharger so as not to supercharge the gas in the intake passage which is to be introduced into the combustion chamber, and when the engine body operates in the preset high load region, the controller is configured to output the control signal to the supercharger to supercharge the gas in the intake passage which is to be introduced into the combustion chamber, and when the engine body operates in a region from the preset low load region to the preset high load region, the controller is configured to output the control signal to the variable valve train mechanism to adjust an opening timing of an intake valve that opens and closes the intake port so that an overlap period during which both the intake valve and an exhaust valve that opens and closes an exhaust port of the engine body are open is equal to or longer than a predetermined crank angle range and to adjust a closing timing of the intake valve so that the effective compression ratio of the engine body is within 2 of the geometric compression ratio of the engine body.

10. The premixed compression ignition type engine with the supercharger of claim 4, wherein
when the engine body operates in the preset high load region, the controller is configured to output the control signal to the variable valve train mechanism to set the overlap period to a crank angle of 40 degrees or more, the overlap period being a period from an opening timing defined as a timing at which a lift of the intake valve is 0.3 mm to a closing timing defined as a timing at which a lift of the exhaust valve is 0.3 mm.

11. The premixed compression ignition type engine with the supercharger of claim 9, wherein
when the engine body operates in the region from the preset low load region to the preset high load region, the controller is configured to output the control signal to the variable valve train mechanism to set the opening and closing timings of the intake valve to a fixed timing or a predetermined timing within a crank angle range of ±5° of the fixed timing.

12. The premixed compression ignition type engine with the supercharger of claim 4, wherein
the variable valve train mechanism is a phase type variable valve train mechanism that can change the opening and closing timings of the intake valve while keeping a valve opening angle of the intake valve constant.

13. The premixed compression ignition type engine with the supercharger of claim 1, wherein
the supercharger includes a mechanical supercharger.

14. The premixed compression ignition type engine with the supercharger of claim 1, wherein
when the engine body operates in a preset low load region, the controller is configured to also output the control signals to the spark plug and the fuel injector so that, after the air-fuel mixture formed in the combustion chamber is ignited by the spark plug and burned by flame propagation, the unburned air-fuel mixture in the combustion chamber is burned by compression ignition.

15. The premixed compression ignition type engine with the supercharger of claim 9, wherein
when the engine body operates in the preset high load region, the controller is configured to output the control signal to the variable valve train mechanism to set the overlap period to a crank angle of 40 degrees or more, the overlap period being a period from an opening timing defined as a timing at which a lift of the intake valve is 0.3 mm to a closing timing defined as a timing at which a lift of the exhaust valve is 0.3 mm.

16. The premixed compression ignition type engine with the supercharger of claim 9, wherein
the variable valve train mechanism is a phase type variable valve train mechanism that can change the opening and closing timings of the intake valve while keeping a valve opening angle of the intake valve constant.

17. The premixed compression ignition type engine with the supercharger of claim 5, wherein
a larger amount of fuel is injected in the first injection than in the second injection.

18. The premixed compression ignition type engine with the supercharger of claim 1, further comprising:
a first phase type variable valve train mechanism which is capable of changing opening and closing timings of an intake valve that opens and closes an intake port of the engine body while keeping a valve opening angle of the intake valve constant; and
a second phase type variable valve train mechanism which is capable of changing opening and closing timings of an exhaust valve that opens and closes an exhaust port of the engine body while keeping a valve opening angle of the exhaust valve constant, wherein
when the engine body operates in a preset low load region, the controller is configured to output the control signal to the supercharger so as not to supercharge the gas to be introduced into the combustion chamber, and outputs the control signal to the first phase type variable valve train mechanism and the second phase type variable valve train mechanism to make the opening and closing timings of the intake valve invariable, and
when the engine body operates in the preset high load region, the controller is configured to output the control signal to the supercharger so as to supercharge the gas to be introduced into the combustion chamber, and output the control signal to the first phase type variable valve train mechanism and the second phase type variable valve train mechanism so that retarding the opening and closing timings of the exhaust valve, compared with a case where the engine body operates in the preset low load region, increases a crank angle range regarding a positive overlap period during which both the intake valve that opens and closes the intake port of the engine body and the exhaust valve that opens and closes the exhaust port of the engine body are open after the top dead center.

19. The premixed compression ignition type engine with the supercharger of claim 4, wherein
when the engine body operates in a highest load region in which a load is higher than a predetermined load in the preset high load region, the controller is configured to output a control signal to the spark plug and the fuel injector to perform spark controlled compression ignition (SPCCI) combustion in which, after the air-fuel mixture formed by air and fuel mixed in the combustion chamber is ignited by the spark plug and burned by flame propagation, the unburned air-fuel mixture in the combustion chamber is burned by compression ignition, and the controller is configured to output the control signal to the supercharger to supercharge the gas to be introduced into the combustion chamber.

* * * * *